United States Patent
Sakamoto et al.

(10) Patent No.: US 6,418,374 B2
(45) Date of Patent: Jul. 9, 2002

(54) NAVIGATION DEVICE

(75) Inventors: Kiyomi Sakamoto, Ikoma; Hiroyuki Hamada, Yawata; Teruaki Ata; Atsushi Yamashita, both of Osaka; Yoshiki Ueyama, Sakai; Isao Ogawa, Yokohama, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/793,990

(22) Filed: Feb. 28, 2001

(30) Foreign Application Priority Data

Mar. 1, 2000 (JP) ........................................ 2000-056081

(51) Int. Cl.[7] ............................. G01C 21/00; G01S 1/02; G01S 1/72; G06F 17/00; G06F 19/00; G06F 165/00

(52) U.S. Cl. ............................. 701/209; 701/200-208; 701/210-215; 701/23-26; 340/995; 340/988; 340/990; 340/991; 340/925; 342/357.09; 342/357.1; 342/357.15; 342/357.13; 342/357.08; 342/457; 342/439; 455/456; 455/557; 455/566; 455/90; 455/575; 705/1

(58) Field of Search ................................. 701/200–215, 701/23, 25, 24, 26; 340/995, 988, 990, 991, 925; 342/357.09, 357.1, 357.15, 357.13, 457, 439, 357.08; 455/456, 557, 566, 90, 575; 705/1

(56) References Cited

U.S. PATENT DOCUMENTS

| | | | | |
|---|---|---|---|---|
| 5,272,638 A | * | 12/1993 | Martin et al. | 340/990 |
| 5,835,881 A | * | 11/1998 | Trovato et al. | 340/988 |
| 5,948,040 A | * | 9/1999 | DeLorme et al. | 340/990 |
| 6,182,006 B1 | * | 1/2001 | Meek | 340/988 |
| 6,192,312 B1 | * | 2/2001 | Hummelsheim | 340/988 |
| 6,192,314 B1 | * | 2/2001 | Khavakh et al. | 701/209 |
| 6,314,369 B1 | * | 11/2001 | Ito et al. | 340/990 |
| 2001/0025222 A1 | * | 9/2001 | Bechtolsheim et al. | 701/209 |
| 2001/0029425 A1 | * | 10/2001 | Myr | 701/200 |
| 2001/0029613 A1 | * | 10/2001 | Fernandez et al. | 725/105 |
| 2001/0034250 A1 | * | 10/2001 | Chadha | 455/90 |
| 2001/0047241 A1 | * | 11/2001 | Khavakh et al. | 701/209 |

FOREIGN PATENT DOCUMENTS

| | | |
|---|---|---|
| DE | 30 06 141 | 10/1981 |
| DE | 197 43 371 | 4/1998 |
| DE | 199 23 750 | 11/1999 |
| JP | 10-103999 | 4/1998 |
| JP | 10-318763 | 12/1998 |
| JP | 11-248485 | 9/1999 |
| JP | 11-272167 | 10/1999 |
| JP | 11-295081 | 10/1999 |

OTHER PUBLICATIONS

Patent Abstracts of Japan, vol. 1999, No. 03, Mar. 31, 1999 & JP 10 318763 A (Alpine Electron Inc), Dec. 4, 1998, Abstract.

* cited by examiner

Primary Examiner—Jacques H. Louis-Jacques
Assistant Examiner—Ronnie Mancho
(74) Attorney, Agent, or Firm—Wenderoth, Lind & Ponack, L.L.P.

(57) ABSTRACT

A navigation device at least includes a CPU and a detector generating a detection signal for determining whether a main device is used inside a vehicle or not. If determining, based on the detection signal from the detector, that the main device is used inside the vehicle, the CPU operates in on-vehicle mode to carry out first navigation (present position estimation and route search) suitable for use in the vehicle. Otherwise, the CPU operates in off-vehicle mode to carry out second navigation (present position estimation and route search) suitable for use outside of the vehicle. Thus, the navigation device can automatically switch its operation mode between on-vehicle mode and off-vehicle mode.

33 Claims, 23 Drawing Sheets

NAVIGATION DEVICE

BACKGROUND OF THE INVENTION

1. Field of the Invention

The present invention relates to navigation devices and, more specifically, to a navigation device structured as usable both inside and outside a vehicle.

2. Description of the Background Art

Conventional vehicle navigation devices display a map and a present position of a vehicle on the map, and search for an optimal route from a starting point to a destination point for guiding a driver. Such a vehicle navigation device is usually mounted fixedly inside the vehicle, and therefore the user cannot use the device outside the vehicle or inside another vehicle. To avoid such inconvenience, research and development has been carried out on navigation devices removable from the vehicle for portable use both inside and outside the vehicle. Such navigation device is exemplarily disclosed in Japanese Patent Laid-Open Publication No. 10-318763, which is described below with reference to FIGS. 24a and 24b.

In FIG. 24a, a navigation device $N_c$ is structured by a main device 101, a GPS (Global Positioning System) antenna 102, and an autonomous navigation sensor 103. The main device 103 is removably mounted on an arm stand 104 fixed in the vicinity of a driver's seat of a vehicle for various operations required for navigating the user. When used inside the vehicle, the navigation device $N_c$ is typically mounted on a dashboard. On the other hand, when used outside the vehicle, the antenna 102 is mounted on an antenna mounting portion 105. Provided on the antenna mounting portion 105 is a micro switch 106 that turns on when the antenna 102 is mounted.

When the above-structured navigation device $N_c$ is used inside the vehicle, the main device 101 is fixedly mounted on the arm stand 104, and supplied with power by a battery provided in the vehicle through a power cable, cigarette socket or others. Moreover, the main device 101 makes a connection with the autonomous navigation sensor 103. Thus, the main device 101 carries out various operations required for user's navigation, which are similar to the conventional ones.

When the navigation device $N_c$ is used outside the vehicle, the user first removes the power cable and autonomous navigation sensor 103 from the main device 101. When the power cable is removed, the main device 101 is automatically supplied with electric power by an internal battery. The user also removes the antenna 102 from the dashboard, and then mounts it on the antenna mounting portion 105. The user then removes the main device 101 from the arm stand 104. Once the antenna 102 is mounted on the antenna mounting portion 105, the micro switch 106 is ON. The state of the micro switch is always monitored by a controller (not shown) of the main device 101. When the micro switch is ON, the controller determines that the main device has been out of the vehicle, and the operation mode is changed to portable mode as shown in a flow chart of FIG. 24b.

In portable mode, the controller stores the present position and the present time when the main device 101 was out of the vehicle, as the present position of the vehicle and the time. The controller also stores cartographic data that has been used until the main device 101 was removed. The cartographic data represents a map covering an area adjacent to the present position of the vehicle (step S1001).

Next, the controller waits for a predetermined time (step S1002), and then detects the present position of the user based on a signal from a GPS satellite (step S1003). The controller further checks whether the detected present position of the user is within a predetermined range of distance (step S1004). If within the range, the procedure goes to step S1005. Otherwise, the procedure goes to step S1006.

In step S1005, the controller checks whether the micro switch is ON, that is, whether the antenna 102 has been removed from the antenna mounting portion 105. If the antenna 102 has been removed, the controller determines that the user came back inside the vehicle, and ends the portable mode. If the micro switch is ON in step S1005, the controller determines that the user is around the vehicle within the predetermined range of distance therefrom, and the procedure goes to step S1006.

In step S1006, the controller checks whether the present position of the user is at a predetermined distance (100 meters, for example) or more from the position previously stored. If the present position is within the predetermined distance, the procedure returns to step S1002 to repeat the process. If, on the other hand, the present position is at 100 meters or more away from the stored position, the controller chronologically stores a set of the present position and the present time (step S1007). Then, the procedure returns to step S1002 to repeat the process.

As described above, the navigation device $N_c$ stores the position when the main device 101 was out of the vehicle as the position of the vehicle. Then, as the user travels the predetermined distance or more, the main device 101 stores the position of the user and the time of the movement. In other words, the controller stores a path of the traveling user. Then, in response to an operation by the user, the controller makes the map, with the path of travel overlaid thereon, displayed on a screen of the main device 101. Thus, the user can recognize his/her own path of travel, and come back to the vehicle along the path. Moreover, with an operation by the user, the controller searches for a route from the present position of the user to the vehicle position, and guides the user to the vehicle along the route.

In portable mode, the conventional navigation device $N_c$ guides the vehicle and the user outside the vehicle. On the other hand, the conventional navigation device $N_c$ guides the vehicle as such when the main device 101 is mounted on the arm stand 104. There is a big difference, however, between guiding users and guiding vehicles. For example, the user can only travel within an area much smaller than that the vehicle can. Therefore, the navigation device $N_c$ can preferably display a relatively small area in detail in portable mode, while displaying a relatively large area when guiding the vehicle. However, even in portable mode, the navigation device $N_c$ uses cartographic data used for guiding the vehicle and displays a map covering a larger area with the path of the traveling user overlaid thereon.

Furthermore, different traffic regulations are applied to pedestrians and vehicles. Therefore, the navigation device $N_c$ searches for a route for guiding the user to the vehicle with the aid of the map used for guiding the vehicle, but the found route is not necessarily optimal for the user as a pedestrian.

As is evident from the above, the navigation device $N_c$ carries out the same operation when used both inside and outside the vehicle, and therefore cannot provide guidance suitable for pedestrians.

SUMMARY OF THE INVENTION

Therefore, an object of the present invention is to provide a navigation device that can automatically determine whether it is used inside or outside a vehicle, and operate in an appropriate mode.

To achieve the object above, the present invention is directed to a navigation device that can be used inside and outside a vehicle, the device comprising a determination part for determining whether the device is used inside or outside the vehicle, and a navigation processing unit. When the determination unit determines that the device is used inside the vehicle, the navigation unit carries out first navigation suitable for use inside of the vehicle. When the determination unit determines that the device is used outside the vehicle, the navigation unit carries out second navigation suitable for use outside of the vehicle.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
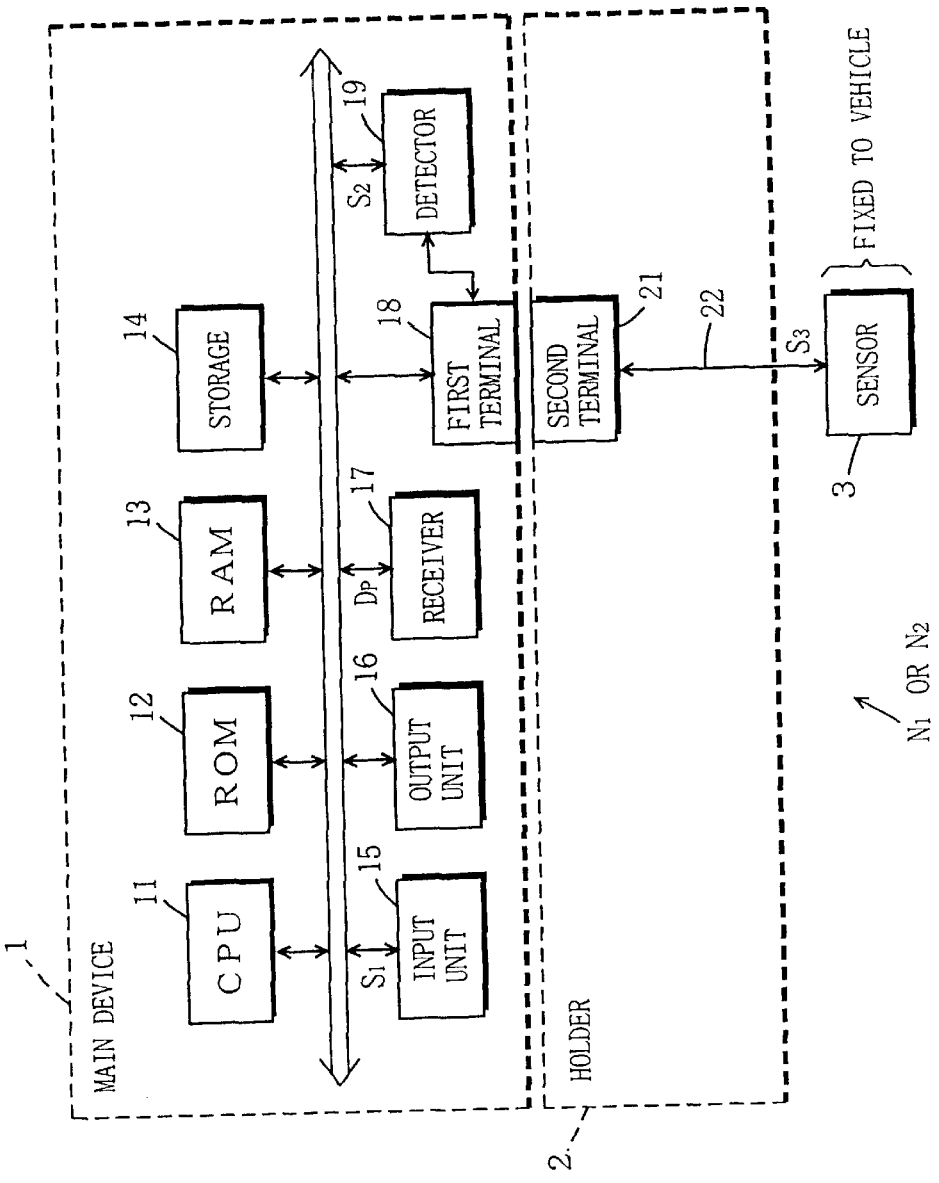
FIG. 1 is a block diagram showing the whole structure of a navigation device $N_1$.

FIG. 1 is a block diagram showing the whole structure of a navigation device $N_1$ according to a first embodiment of the present invention. In FIG. 1, the navigation device $N_1$ mainly includes a main device 1, a holder 2, and a sensor 3.

The main device 1 accommodates a CPU 11, ROM 12, RAM 13, a storage 14, an input unit 15, an output unit 16, a receiver 17, a first terminal 18, and a detector 19, all communicably interconnected with one another. The CPU 11 is communicably connected to the sensor 3 though a first terminal 18 of the main device 1 and a second terminal 21 of the holder 2.

The CPU 11 operates by following a program previously stored in the ROM 12, and uses the RAM as a working area to execute operations required for navigation suitable for vehicles and pedestrians. Such operations typically include present position estimation, route search, and route guide.

The storage 14 is typically implemented by a CD drive, DVD drive, or hard disk drive, storing various data required for navigation. Normally, the storage 14 stores in advance cartographic database $DB_{CART}$ and road network data $D_{NET}$.

In the present embodiment, the cartographic database $DB_{CART}$ is constructed by a plurality of cartographic files $F_{CART}$ each representing a map of a different scaling factor SF. Here, the scaling factor SF is a rate of reduction of a map. Therefore, if the scaling factor SF is larger, the cartographic file $F_{CART}$ represents a map of a wider area. Such cartographic file $F_{CART}$ is mainly used for displaying a map.

The road network data $D_{NET}$ is mainly used for searching for a route, and defines, by nodes and links, connections among intersections and roads on the map represented by each cartographic file $F_{CART}$. Furthermore, the road network data $D_{NET}$ also includes, as required, data about coordinates, shapes, and attributes, and traffic regulations of both intersections and roads.

Figure 2:
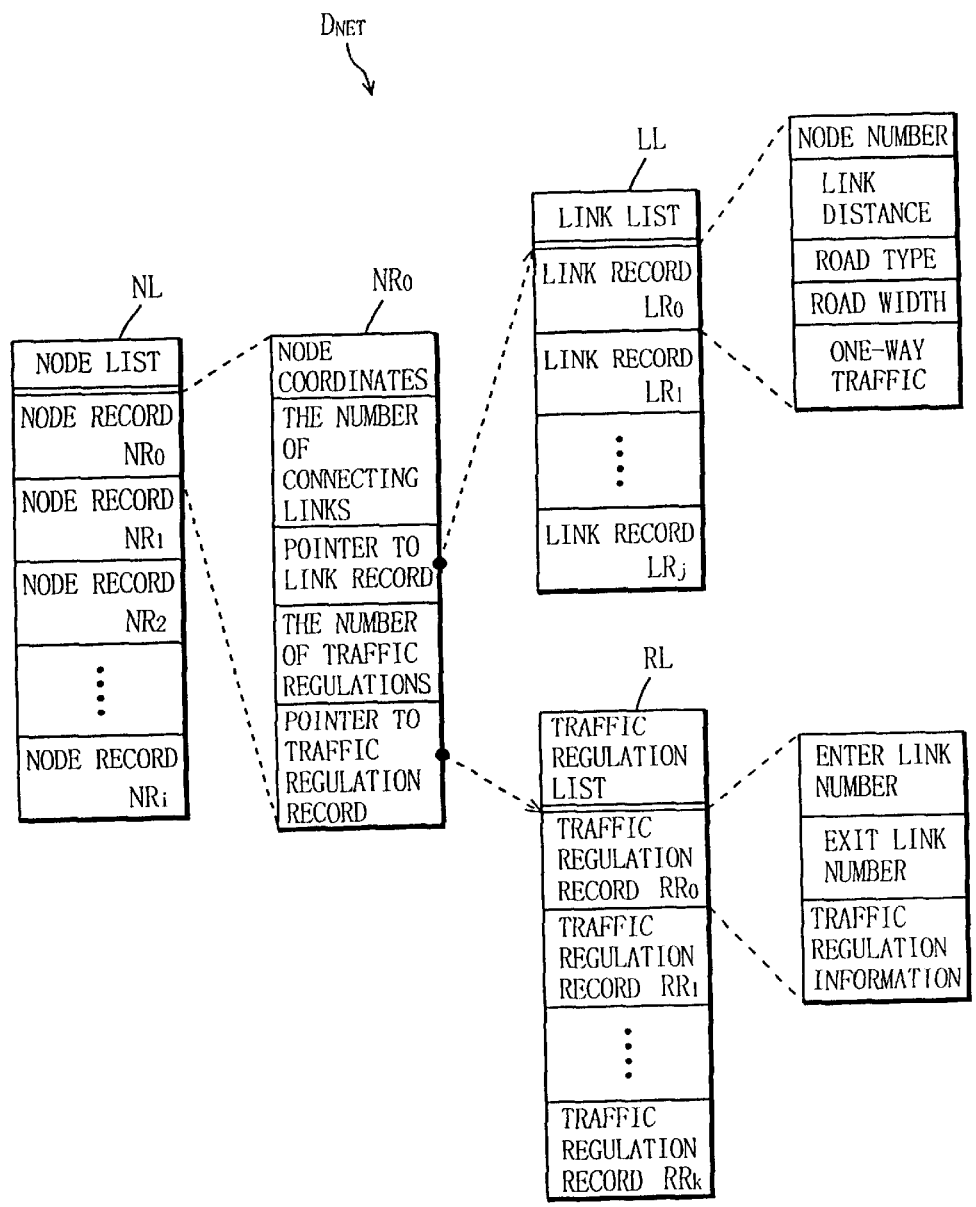
FIG. 2 is a diagram showing one example of data structure of road network data $D_{NET}$.

FIG. 2 shows one example of data structure of the road network data $D_{NET}$. In FIG. 2, the road network data $D_{NET}$ is constructed mainly by a node list NL, a link list LL, and a traffic regulation list RL.

The node list NL is composed of records $NR_0$ to $NR_i$ of nodes #0 to #i included in a road network.

The record $NR_0$ is composed of coordinates of the node #0 (generally defined by latitude and longitude of that node), the number of connecting links to the node #0, a pointer specifying a recording location for a record LR of one link, the number of traffic regulations, and a pointer specifying a recording location for a record RR of one traffic regulation. Other records $NR_1$ to $NR_i$ are composed similarly.

The link list LL is composed of records $LR_0$ to $LR_j$ of links #0 to #j included in the road network. The record $LR_0$ is composed of node numbers of the nodes located at both ends of the link #0, link distance, road type, road width, and one-way traffic information. Other records $LR_1$ to $LR_j$ are composed similarly.

The traffic regulation list RL is composed of records $RR_0$ to $RR_k$ of all traffic regulations #0 to #k provided for the nodes #0 to #i. The record $RR_0$ is composed of an enter link number, exit link number, and traffic regulation information. Other records $RR_1$ to $RR_k$ are composed similarly. In the present embodiment, it is assumed for convenience that the traffic regulation list RL only includes regulations for vehicles.

Figure 3:
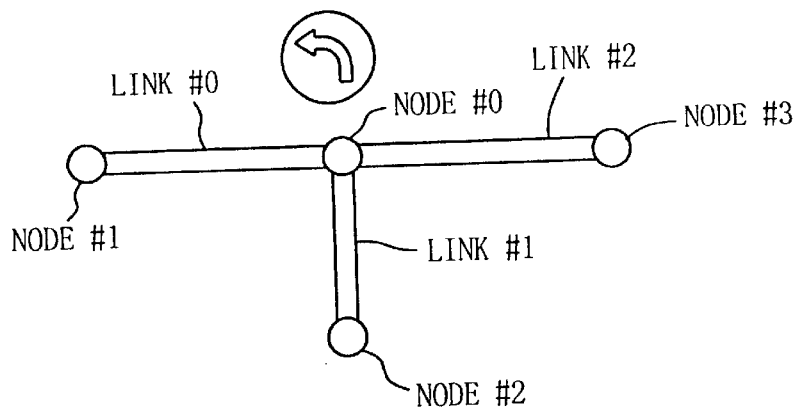
FIG. 3 is a diagram demonstrating the road network data $D_{NET}$ in further detail.

With reference to FIG. 3, the above road network data $D_{NET}$ is more specifically described. In FIG. 3, assume that one ends of the links #0, #1, and #2 are connected at one node #0. The other ends of those links are the nodes #1, #2, and #3, respectively. Also assume that, when entering the node #0 from the link #1, a vehicle is allowed by a traffic regulation to exit only to the link #0. Under such assumption, in the record $NR_0$, the number of connecting links indicates "3", and the pointer specifies recording locations of the records $LR_0$ to $LR_2$. The number of traffic regulations is "1", and the pointer specifies, for example, the recording location of the record $RR_0$.

Also, in the record $LR_2$, the node numbers are "#3" and "#0". The exemplary one-way traffic regulation is "#3"→"#0", representing that the vehicle can go only from the node #3 to the node #0.

Also in the record $RR_0$, the enter link number is "#1", the exit link number is "#0", and the traffic regulation information indicates that the vehicle can make only a left turn.

Referring back to FIG. 1, the input unit 15 is typically implemented by a remote controller, touch sensor, key board, mouse, and a combination of two or more among these devices. The user operates the input unit 15 to select a function of the navigation device $N_1$, switch the map to be displayed, or set various points that the user designates. The input unit 15 typically produces an operation signal $S_1$ indicating the operation by the user, and transmits it to the CPU 11.

The output device 16 is typically implemented by a liquid crystal display device and a loudspeaker, displaying a map on a screen based on the cartographic file $F_{CART}$, displaying a route based on route data $D_R$ required for route guidance, and producing sounds as required.

The receiver 17 is typically implemented by a GPS receiver, calculating the present position of the main device 1 based on the information transmitted from an artificial satellite and transmitting calculation results to the CPU 11 as positional data $D_P$. Note that the receiver 17 is not restricted to such a GPS receiver, but may be any receiver as long as it can calculate the present position of the main device 1 to realize so-called heteronomous navigation that is an antonym of autonomous navigation. In heteronomous navigation, the present position of the main device 1 is derived not from a detection result by a sensor incorporated in a vehicle as in autonomous navigation, but from information received from a positioning system such as GPS.

The first terminal 18 is provided on the main device 1 and makes a contact to the second terminal 21, electrically connecting the CPU 11 and the sensor 3 together.

The detector 19 monitors a state of the first terminal 18 to detect whether the main device 1 is removed from or mounted on the holder 2, and transmits a detection signal $S_2$ indicating the detection result to the CPU 1.

The holder 2 is structured so as to removably hold the main device 1, and is fixed to the vicinity of a driver's seat. When the user drives the vehicle, the main device 1 is mounted on the holder 2, thereby allowing the user to easily view the screen of the output device 16. And the main device 1 is removed from the holder 2, thereby allowing the user to use the main device outside the vehicle. Such holder 2 includes at least the second terminal 21 and a wiring 22.

The second terminal 21 is a terminal for electrically connecting the CPU 11 etc. of the main device 1 and the holder 2 together. When the main device 1 is mounted on the holder 2, the second terminal 21 makes a contact to the first terminal 18. Thus the holder 2 is electrically connected to the main device 1.

One end of the wiring 22 is connected to the second terminal 21, while the other is to the sensor 3.

The sensor 3 typically includes an azimuth sensor (typically, a gyro-compass) and a vehicle speed sensor, directly mounted on the vehicle and on remote to both of the main device 1 and the holder 2. When the main device 1 and the holder 2 are connected together, the sensor 3 detects an azimuth and a vehicle speed at predetermined intervals, and transmits a detection signal $S_3$ indicating the detection result to the CPU 11. Note that, other than the azimuth sensor and the vehicle speed sensor, the sensor 3 may include any components as long as it can detect parameters unique to the vehicle to achieve so-called autonomous navigation. As stated above, autonomous navigation is a technique for deriving the present position of the main device 1 from the detection result by the sensor 3 mounted on the vehicle.

Figure 4:
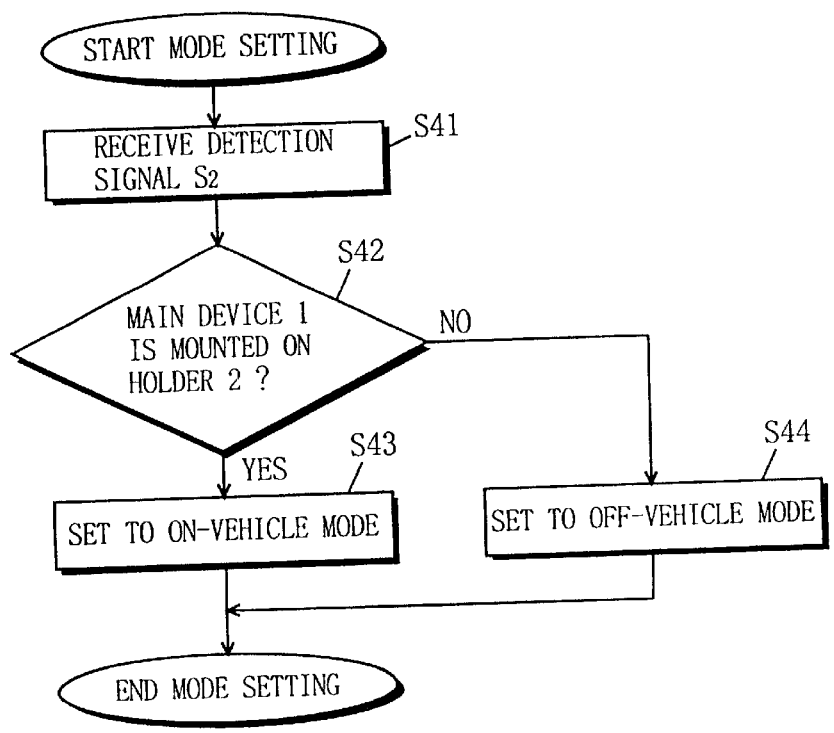
FIG. 4 is a flow chart showing a mode setting procedure executed by the navigation device $N_1$.

The operation of the navigation device $N_1$ is described below. When the navigation device $N_1$ is powered on, the CPU 11 operates by following a program stored in the ROM 12, and executes first a mode setting process shown in FIG. 4. In FIG. 4, the CPU 11 receives the detection signal $S_2$ from the detector 19 (step S41). Then, the CPU 11 determines, based on the received detection signal $S_2$, whether the main device 1 is mounted on the holder 2 or not (step S42).

If determining that the main device 1 is mounted on the holder 2, the CPU 11 sets an operation mode required for estimation of the present position (refer to FIG. 5) and route search/guide (refer to FIG. 6, etc.) as "on-vehicle mode" (step S43). If determining otherwise, the CPU 11 sets the operation mode as "off-vehicle mode" (step S44). More specifically, in step S43 or S44, the CPU 11 exemplarily sets a flag indicating "on-vehicle mode" or "off-vehicle mode" in a recording area of the RAM 13. After setting the operation mode, the CPU 11 ends the mode setting process shown in FIG. 4.

Figure 5:
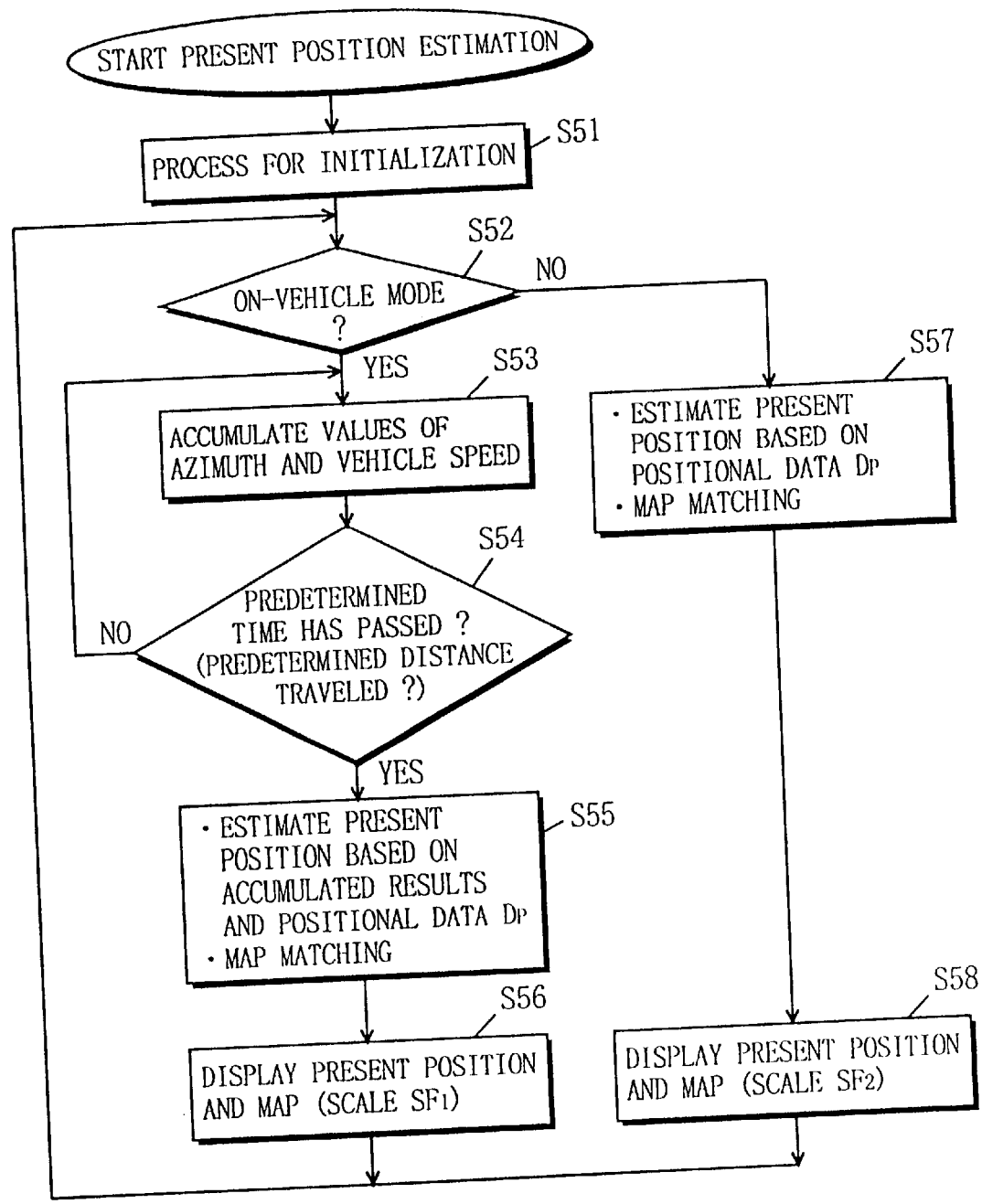
FIG. 5 is a flow chart showing a present position estimation procedure executed by the navigation device $N_1$.

After ending the mode setting process, the navigation device $N_1$ carries out estimation of the present position as shown in FIG. 5. In FIG. 5, the CPU 11 first carries out initialization (step S51). For example, in step S51, the cartographic file $F_{CART}$ that has been used until previous power-off or that includes the present position of the main device 1 is read from the storage 14 into the RAM 13, and a working area required for estimation of the present position is allocated. If the position of the main device 1 when powered on is close to that when powered off last time, the accumulated results (refer to step S53) used until the main device 1 was powered off last time may be read into the RAM 13.

After step S51, the CPU 11 operates as a determination part in claims, determining whether the operation mode is "on-vehicle mode" or not (step S52). In the present embodiment, the operation mode is defined by the flag. Therefore, the CPU 11 checks in step S52 whether the flag indicates "on-vehicle mode" or "off-vehicle mode".

If the operation mode is "on-vehicle mode", the CPU 11 finds that the main device 1 is used inside the vehicle, and accumulates the values of the azimuth and vehicle speed based on the detection signal $S_3$ from the sensor 3 (step S53). Then, the CPU 11 determines in step S54 whether a predetermined time has passed after previous estimation (refer to step S55). In step S54, the CPU 11 may determine whether the vehicle has traveled a predetermined distance from previously estimated position. If the predetermined time has not passed yet, the procedure returns to step S53 to repeatedly accumulate the values of the azimuth and vehicle speed.

On the other hand, if determining in step S54 that the predetermined time has passed or the vehicle has traveled the predetermined distance, the CPU 11 receives the positional data $D_P$ from the receiver 17. Also, the CPU 11 estimates the present position of the main device 1 based on the accumulated results as to the azimuth and vehicle speed and the position specified by the positional data $D_P$. In other words, estimation of the present position is carried out by a combination of autonomous and heteronomous navigation techniques. Then, the CPU 11 performs map matching based on the cartographic file $F_{CART}$ for matching the estimated present position on the road in the map represented by the cartographic file $F_{CART}$ read in the RAM 13 (step S55).

Note that the cartographic file $F_{CART}$ used in step S55 may be read from the storage 14 into the RAM 13 anytime during estimation of the present position, more specifically, after once step S55 is executed. Also note that the cartographic file $F_{CART}$ read at one time preferably covers an area larger than that displayable on the screen of the output device 16 at one time. Thus, the number of times the cartographic file $F_{CART}$ has to be transferred from the storage 14 into the RAM 13 can be reduced.

The scaling factor $SF_1$ of the read cartographic file $F_{CART}$ for on-vehicle mode is predetermined. In most cases, the vehicle speed is higher than the walking speed of the user. Therefore, the scaling factor $SF_1$ is selected so as to be at least larger in value than the scaling factor $SF_2$ for off-vehicle mode. With such scaling factor $SF_1$, the output unit 16 can display a map covering a relatively large area on the screen.

After step S55, the CPU 11 operates as one example of a navigation processing part in claims, making the output unit 16 display the estimated present position and its adjacent area map represented by the cartographic file $F_{CART}$ (scaling factor $SF_1$) (step S56). Thus, the user can visually recognize the present position of the vehicle. Normally, the output unit 16 displays the map with the scaling factor $SF_1$, but can also display the map with another scaling factor based on an operation of the input unit 15 by the user. In on-vehicle mode, the above steps S52 through S56 are repeated.

Referring back to step S52, when determining that the operation mode is not "on-vehicle mode", the CPU 11 regards that the user has removed the main device 1 from the holder 2 and carries it for use outside the vehicle. In this case, the CPU 11 cannot receive the detection signal $S_3$ and therefore receives only the positional data D, from the receiver 17. Further, for map matching, the CPU 11 uses the cartographic file $F_{CART}$ representing the area adjacent to the present position specified by the positional data $D_P$. Thus, the CPU 11 carries out matching of the estimated present position on a road represented by the cartographic file $F_{CART}$ (step S57).

Note that the cartographic file $F_{CART}$ used in step S57 may be read from the storage 14 into the RAM 13 anytime during estimation of the present position, more specifically, after once step S57 is executed. Also, note that, as stated above, the cartographic file $F_{CART}$ read at one time preferably covers an area larger than that displayable on the screen of the output device 16 at one time.

The scaling factor $SF_2$ of the read cartographic file $F_{CART}$ for off-vehicle mode is predetermined. In most cases, the walking speed of the user is lower than the vehicle speed. Therefore, the scaling factor $SF_2$ is so selected as to be at least smaller in value than the scaling factor $SF_1$ for on-vehicle mode. With such scaling factor $SF_2$, the output unit 16 can display a map covering a relatively small area on the screen.

Then, the CPU 11 operates as one example of the navigation processing part in claims. Further, the CPU 11 makes the output unit 16 display the estimated present position and its adjacent area map represented by the cartographic file $F_{CART}$ (scaling factor $SF_2$) (step S58). Thus, the user can visually recognize the present position of the vehicle. Also in this case, the output unit 16 can display the map with a scaling factor except the scaling factor $SF_2$ based on an operation of the input unit 15 by the user. In off-vehicle mode, the above steps S52→S57 →S58 are repeated.

Here, in the present embodiment, the present position is estimated in off-vehicle mode based on only the positional data $D_P$ received from the artificial satellite. Therefore, the estimated present position contains a considerable amount of errors. To correct the errors, the navigation device $N_1$ preferably receives radio waves carrying error correction information from a base station within a system called D-GPS (Differential GPS).

Figure 6:
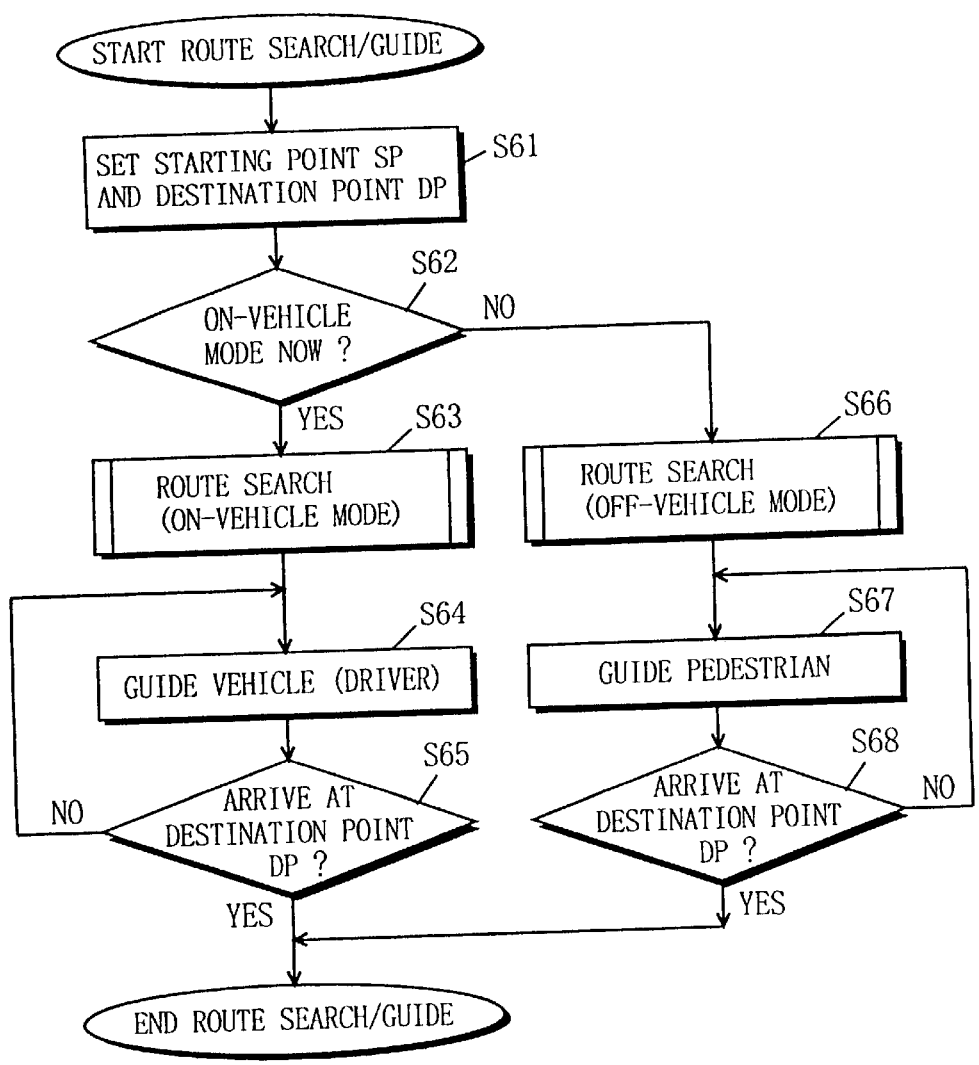
FIG. 6 is a flow chart showing a route search/guide procedure executed by the navigation device $N_1$.

The navigation device $N_1$ also carries out route search/guide shown in FIG. 6 as required. This is started by the user operating the input unit 15. In FIG. 6, the CPU 11 first sets a starting point SP and a destination point DP for route search (step S61). More specifically, for example, the user operates the input unit 15 to specify the starting point SP and the destination point DP. In response to such operation, the input unit 15 sends the CPU 11 an operation signal $S_1$ indicating the specified starting point SP and the destination point DP, for example, by latitude and longitude. Alternatively, the CPU 11 may receive the positional data $D_P$ from the receiver 17 as the starting point SP, while receiving the destination point DP from the input unit 15. The CPU 11 then stores the received starting point SP and destination point DP in the RAM 13.

Figure 7:
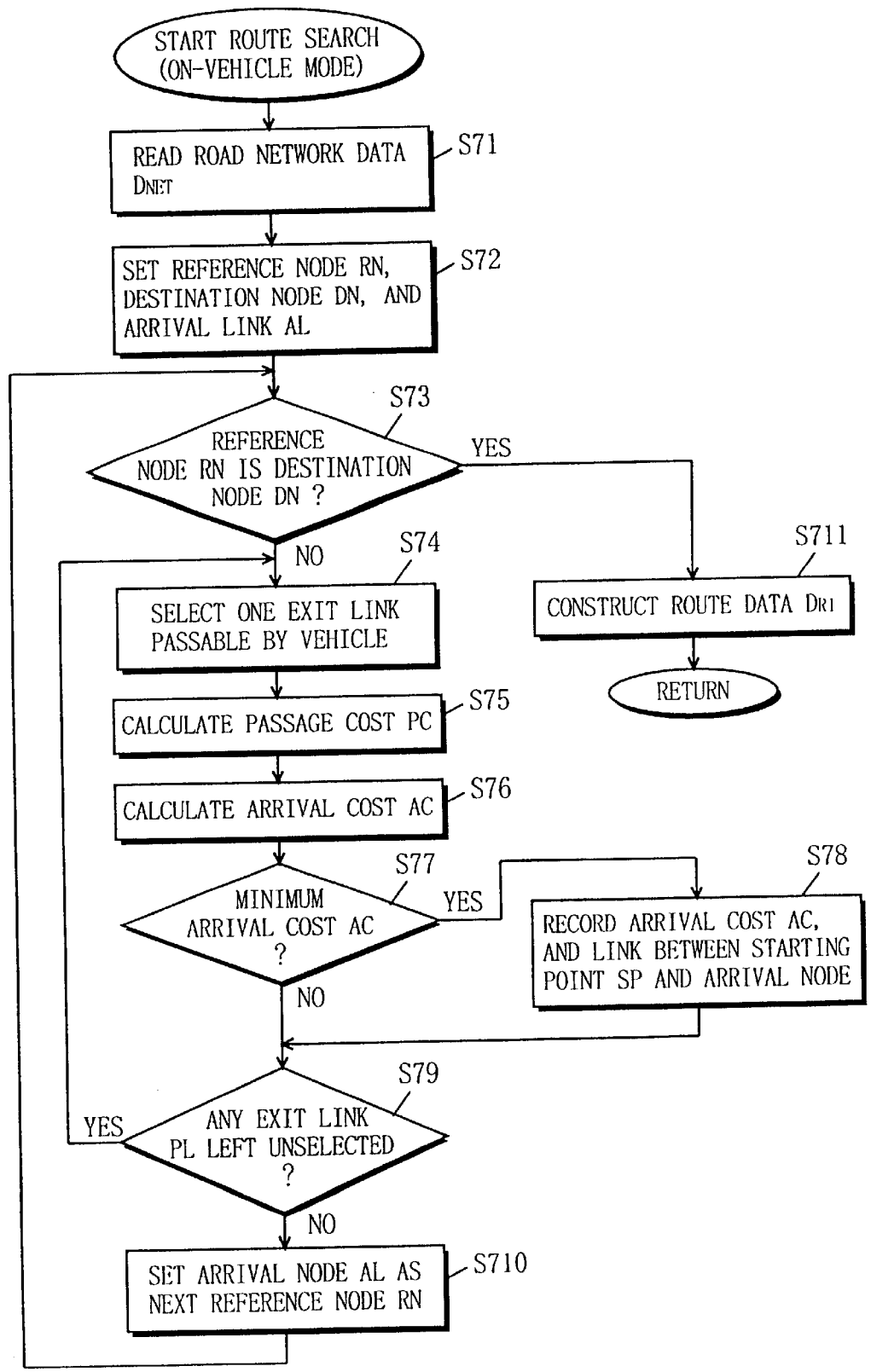
FIG. 7 is a flow chart showing a detailed procedure for route search (step S63 in FIG. 6) in on-vehicle mode.

After step S61, the CPU 11 operates as the determination part in claims, determining whether the operation mode is "on-vehicle mode" or not (step S62), in a similar manner to that in step S52. If "on-vehicle mode", the CPU 11 operates as a navigation processing part in claims, searching for a route in on-vehicle mode (step S63). FIG. 7 is a flow chart showing the detailed procedure of route search in on-vehicle mode. In FIG. 7, the CPU 11 reads the road network data $D_{NET}$ specifying the road network of a predetermined range $R_{PRE}$ required for route search (step S71). The predetermined range $R_{PRE}$ is a range presumably covering the shortest route from the starting point SP to the destination point DP set in step S61, and is preferably defined as a rectangle including the starting point SP and the destination point DP.

Then, the CPU 11 sets a first reference node RN, a destination node DN, and a first arrival link AL (step S72). For the first reference node RN, a node closest to the starting point SP is selected. For the destination node DN, a node closest to the destination point DP is selected. For the first arrival link AL, a link that is closest to the starting point SP and from which the vehicle can enter the first reference node RN is selected.

Then, the CPU 11 determines whether the present reference node RN is the destination node DN or not (step S73) The reference node RN can be presumed at first to be the starting point SP. Therefore, in step S73 for the first time, it is presumed that the reference node RN does not coincide with the destination node DN. Thus, the CPU 11 searches the road network data $D_{NET}$ loaded into the RAM 13 for links to which the vehicle can exit the reference node RN after entering it from the first arrival link AL. The CPU 11 then selects one of the found links as the exit link PL (step S74). Note that this selection is made by referring to the traffic regulations, road type, and one-way traffic information for vehicles.

The process in step S74 is specifically described. For example, assume that the reference node RN is set to the node #2, and the arrival link AL is set to the link #0. Under this assumption, the CPU 11 refers to a pointer in the record $NR_2$ to find the relevant traffic regulation record RR indicated thereby. Now assume that the record $RR_0$ is found. If the enter link number "#0", the exit link number "#2", and "no left turn" are described in the record $RR_0$, the CPU 11 can recognize that the link #2 is selectable as the exit link PL when the vehicle enters the node #2 from the link #0. The CPU 11 also refers to a pointer in the record $NR_2$ to find the relevant record LR of the link connected to the node #2. Now assume that the record $LR_1$ is found. If the road type "pedestrian-only street", the road width "3.0 meters", or the one-way traffic "no enter from the node #2" are described in the record $LR_1$, the CPU 11 can recognize that the link #1 is not selectable as the exit link. As such, based on the road network data $D_{NET}$, the CPU 11 can select the exit link PL through which the vehicle can travel while abiding by the traffic regulations.

After step S74, the CPU 11 calculates a passage cost PC when the vehicle travels through the selected exit link PL (step S75). In step S75, the link distance described in the record LR is used as the passage cost PC. The CPU 11 then selects a node located at the other end of the selected exit link as an arrival node AN, and calculates an arrival cost AC from the starting point to the arrival node AN (step S76)

The CPU 11 then determines whether the calculated arrival cost AC is minimum or not among the arrival costs AC previously calculated as to the selected arrival node AN (step S77). Here, if the starting point SP is set as the reference node RN, the arrival cost AC for each arrival node AN is first calculated. In this case, in step S77, the CPU 11 regards initial arrival cost AC is infinite. As a result, the CPU 11 determines the arrival cost AC is minimum. If the arrival cost is minimum, the CPU 11 records, in the RAM 13, the calculated arrival cost AC, and links between the starting point SP and the arrival node AN (step S78). The procedure then goes to step S79.

If not minimum in step S77, on the other hand, the procedure directly goes to step S79.

After step S77 or S78, the CPU 11 determines whether any exit link PL is left unselected or not (step S79). The exit link PL means a link through which the vehicle can exit from the arrival link AL via the reference node RN. If any exit link PL is left unselected, the procedure returns to step S74. In other words, the CPU 11 newly selects one exit link PL, and executes the process described above such as calculation of the arrival cost AC (steps S74 to S78).

By repeating the above steps S74 to S78, the CPU 11 calculates the arrival cost AC from the reference node RN (starting point SP) to all relevant arrival nodes AN. If determining in step S79 that any exit link PL is not left unselected, the CPU 11 selects, as the next reference node RN, the arrival node AN of the minimum arrival cost AC from among the arrival nodes AN not yet selected as the reference node RN but whose arrival costs AC have been calculated (step S710).

The procedure then returns to step S73, wherein the CPU 11 executes steps S73 through S79 by referring to the newly set reference node RN. Thus, the route search goes on from the starting point SP toward the destination point DP and, in the end, the reference node RN coincides with the destination node DN. When the procedure goes to step S711, the RAM 13 has already stored the minimum arrival cost AC and the links between the starting point SP and the destination point DP. The links recorded in the RAM 13 are combined to indicate a route connecting the starting point SP and the destination point DP and having the minimum arrival cost AC. Therefore, based on the information recorded in the RAM 13, the CPU 11 constructs route data $D_{R1}$ indicating the route that is optimal for the vehicle to travel from the starting point SP to the destination point DP (step S711).

After the above step S711 ends, the procedure exits from the flow chart of FIG. 7 (that is, step S63 of FIG. 6), and goes to step S64. The CPU 11 makes the screen of the output unit 16 display the adjacent area map on which the optimal route and the present position of the vehicle are overlaid. The CPU 11 also produces sounds from the loudspeaker as required (step S64). Thus, the vehicle is guided from the starting point SP to the destination point DP. Note that, similarly to step S56, the displayed map preferably has a relatively large scaling factor SF.

The CPU 11 then determines whether the present position of the vehicle coincides with the destination point DP or not (step S65). If the present position does not coincide with the destination point DP, the procedure returns to step S64, and continues guiding the vehicle. If it coincides, the procedure of FIG. 6 ends.

Figure 8:
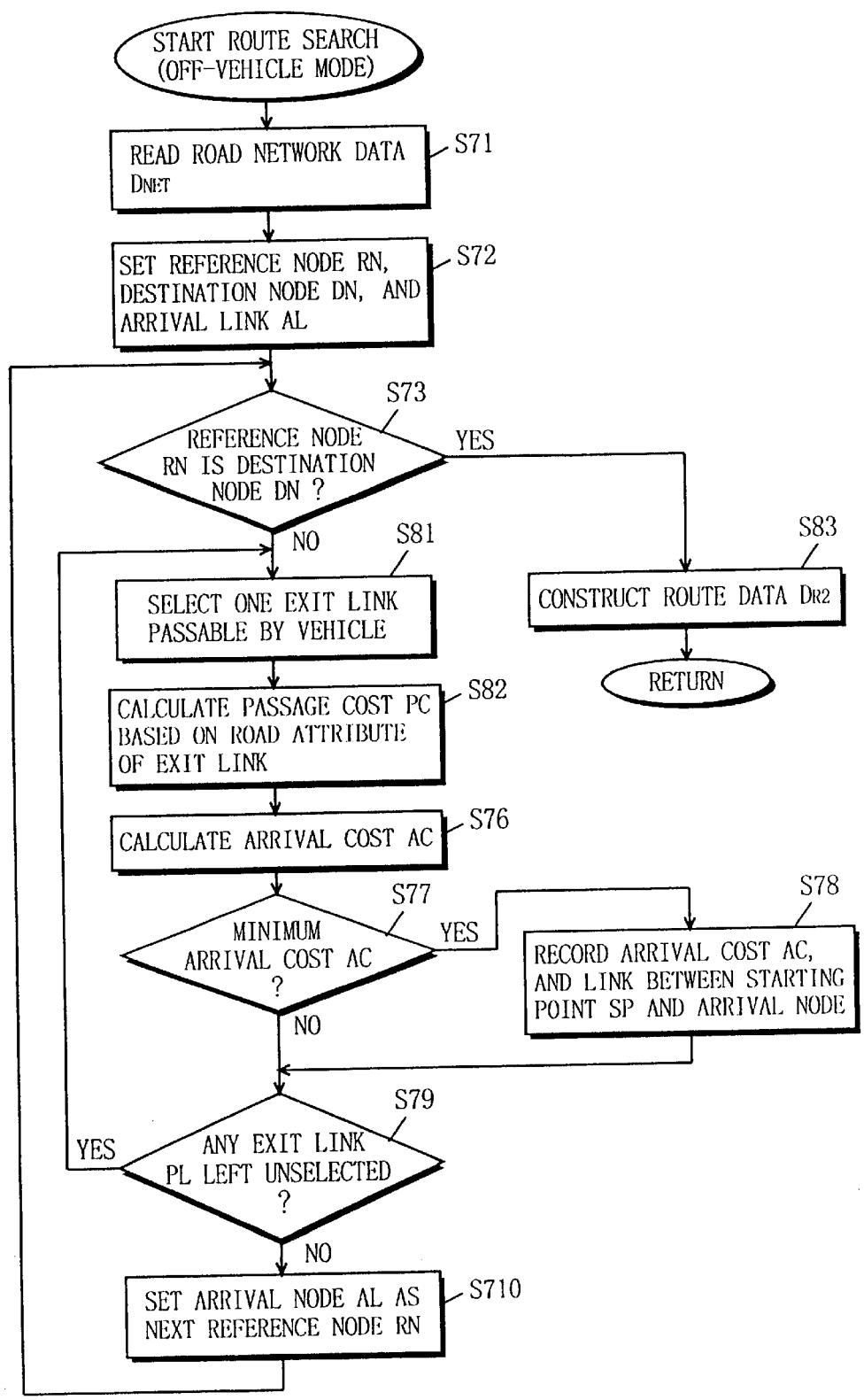
FIG. 8 is a flow chart showing a detailed procedure for route search (step 66 in FIG. 6) in off-vehicle mode.

Referring back to step S62 of FIG. 6, if determining that the operation mode is not "on-vehicle mode", the CPU 11 operates as one example of the navigation processing unit in claims, carrying out route search in off-vehicle mode (step S66). FIG. 8 is a flow chart showing the detailed procedure for route search in off-vehicle mode. The procedure of FIG. 8 is different from that of FIG. 7 only in that steps S74, S75, and S711 are replaced with steps S81, S82, and S83. The other steps in FIG. 8 are provided with the same reference numbers as those in FIG. 7, and not described herein.

In step S81, the CPU 11 searches the road network data $D_{NET}$ loaded into the RAM 13, and selects, as the exit link PL, any one of the links through which the pedestrian can exit from the reference node RN after entering it from the arrival link AL (step S81). Note that the CPU 11 does not refer to information related to vehicles in the road network data $D_{NET}$. Such information includes traffic regulations for vehicles, and the road type, road width and one-way traffic information for the road only travelable by vehicles.

The process in step S81 is now specifically described. For example, assume that the reference node RN is the node #2, and the arrival link AL is the link #0. Under this assumption, the CPU 11 does not refer to the traffic regulation list RL in the record $NR_2$. The CPU 11 does not also refer to the road width or the one-way traffic information, if any, described in each of the records $LR_0, LR_1, \ldots$, since they are not relevant to pedestrians. The CPU 11 selects the exit link PL from the links #0, #1, ... connected to the reference node #2. As such, the CPU 11 can select, based on the road network data $D_{NET}$, the exit link PL passable by the pedestrian.

After step S81, the CPU 11 calculates the passage cost PC, which is an evaluation value for the selected exit link PL when passed through, in a similar manner to that in step S74 (step S82). However, the CPU 11 assumes the passage cost PC as "infinite" if the road attribute of the selected exit link PL is "highway" or "vehicle-dedicated road". Thus, at route search in off-vehicle mode, a road travelable only by pedestrians (users) is selected.

After the above procedure in FIG. 8, when the procedure goes to step S710, the RAM 13 has already stored therein a route connecting the starting point SP and the destination point DP and having the minimum arrival cost AC. Therefore, based on the information recorded in the RAM 13, the CPU 11 constructs route data $D_{R2}$ indicating the route that is optimal for the pedestrian to travel from the starting point SP to the destination point DP (step S711) with the minimum arrival cost AC (step S83).

After the above step S83, the procedure exits the flow chart of FIG. 8 (that is, step S66 of FIG. 6), and goes to step S67. Then, with the route indicated by the route data $D_{R2}$, the pedestrian is guided from the starting point SP to the destination point DP (step S67). At this time, the map suitable for guiding pedestrian is preferably displayed on the screen of the output unit 16.

After step S67, the CPU 11 determines whether the present position of the pedestrian coincides with the destination point DP or not (step S68). If the present position does not coincide with the destination point DP, the procedure returns to step S67, and the CPU 11 continues guiding the pedestrian. If the present position coincides with the destination point DP, the procedure of FIG. 6 ends.

Figure 9A:
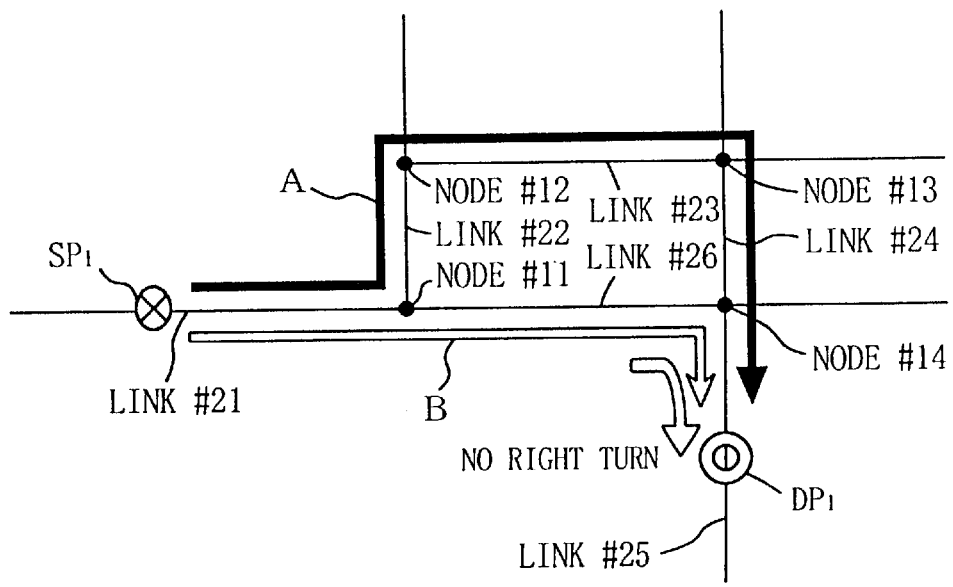
FIGS. 9a and 9b are diagrams each showing one example of an optimal rout found by the navigation device $N_1$.
Figure 9B:
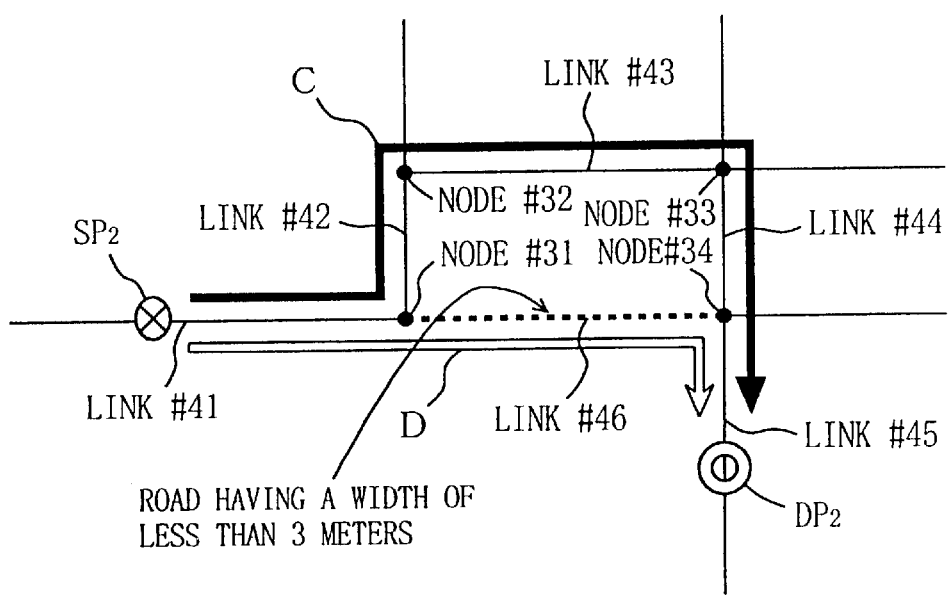

With the above process of FIG. 6, the route found by the navigation device $N_1$ differs between on-vehicle mode and off-vehicle mode, even though the same starting point SP and the same destination point DP are set therebetween. FIGS. 9a and 9b are diagrams each showing an example of a route found by the navigation device $N_1$. FIG. 9a schematically shows an example of the road network data $D_{NET}$ composed of nodes #11 to #14 and links #21 to #26. The node #11 connects the links #21, #22, and #26; the node #12 connects the links #22 and #23; the node #13 connects the links #23 and #24; and the node #14 connects the links #24, #25, and #26. Assume herein that, in the road network data $D_{NET}$, the traffic regulation record RR of the node #14 describes that the vehicle cannot exit to the link #25 from the link #26 through the node #14.

Here, consider the case of "on-vehicle mode". Assume that the navigation device $N_1$ starts route search, and sets a starting point $SP_1$ and a destination point $DP_1$ as shown in FIG. 9a. Under such assumption, in the case where the reference node RN is the node #14 and the arrival link AL is the link #26, the link #25 is not selected in step S74 of FIG. 7 as the exit link PL to which the vehicle can exit. Consequently, the route data $D_{R1}$ obtained in step S711 of FIG. 7 indicates, as shown by a black arrow A in FIG. 9a, a route composed of the links #21 through #25.

Next, consider the case of "off-vehicle mode". Under the same assumption and the same case as the above, the CPU 11 does not refer to the traffic regulation record RR of the node #14. Therefore, the link #25 can be selected in step S81 of FIG. 8 as the exit link PL to which the pedestrian can exit. Consequently, the route data $D_{R21}$ obtained in step S711 of FIG. 7 indicates, as shown by a hollow arrow B in FIG. 9a, a route composed of the links #21, #26, and #25.

FIG. 9b schematically shows an example of the road network data $D_{NET}$ composed of nodes #31 to #34 and links #41 to #46. The node #31 connects the link #41 and #42; the node #32 connects the links #42 and #43; the node #33 connects the links #43 and #44; and the node #34 connects the links #44, #45, and #46. Assume herein that, in the road network data $D_{NET}$, the road width of the link #46 is "less than 3 meters".

Here, consider the case of "on-vehicle mode". Assume that the navigation device $N_1$ starts route search and set a starting point $SP_2$ and a destination point $DP_2$ as shown in FIG. 9b. Under such assumption, in the case where the reference node RN is the node #31 and the arrival link AL is the link #41, the link #46 is not selected in step S74 of FIG. 7 as the exit link PL to which the vehicle can exit. Consequently, the route data $D_{R12}$ obtained in step S711 of FIG. 7 indicates, as shown by a black arrow C in FIG. 9b, a route composed of the links #41 through #45.

Next, consider the case of "off-vehicle mode". Under the same assumption and the same case as the above, the CPU 11 does not refer to the road width of the link #46. Therefore, the link #46 can be selected in step S81 of FIG. 8 as the exit link PL to which the pedestrian can exit. Consequently, the route data $D_{R22}$ obtained in step S711 of FIG. 7 indicates, as shown by a hollow arrow D in FIG. 9b, a route composed of the links #41, #46, and #45.

As is evident from the above description, the navigation device $N_1$ automatically determines whether the main device 1 is mounted on the holder 2 or not, and sets the operation mode to "on-vehicle mode" or "off-vehicle mode" based on the determination. In on-vehicle mode, the main device 1 refers to information such as the traffic regulation, road type, road width, and one-way traffic information described in the road network data $D_{NET}$ for searching a route suitable for the vehicle. In off-vehicle mode, on the other hand, the main device 1 does not refer to such information, and therefore can search a route suitable for the pedestrian.

In the above description, route search clearly differs between on-vehicle mode and off-vehicle mode depending on whether or not the information only related to vehicles such as the traffic regulation and road width is considered. This is not restrictive, and the present embodiment can be achieved as long as what is searched for in on-vehicle mode is a route only passable by vehicles, and what is searched for in off-vehicle mode is a route only passable by pedestrians.

Next, a navigation device $N_2$ according to a second embodiment of the present invention is described. The navigation device $N_2$ is similar in structure to the navigation device $N_1$ shown in FIG. 1, but is different therefrom in that it executes route search/guide shown in FIG. 10, which is described below.

Figure 10:
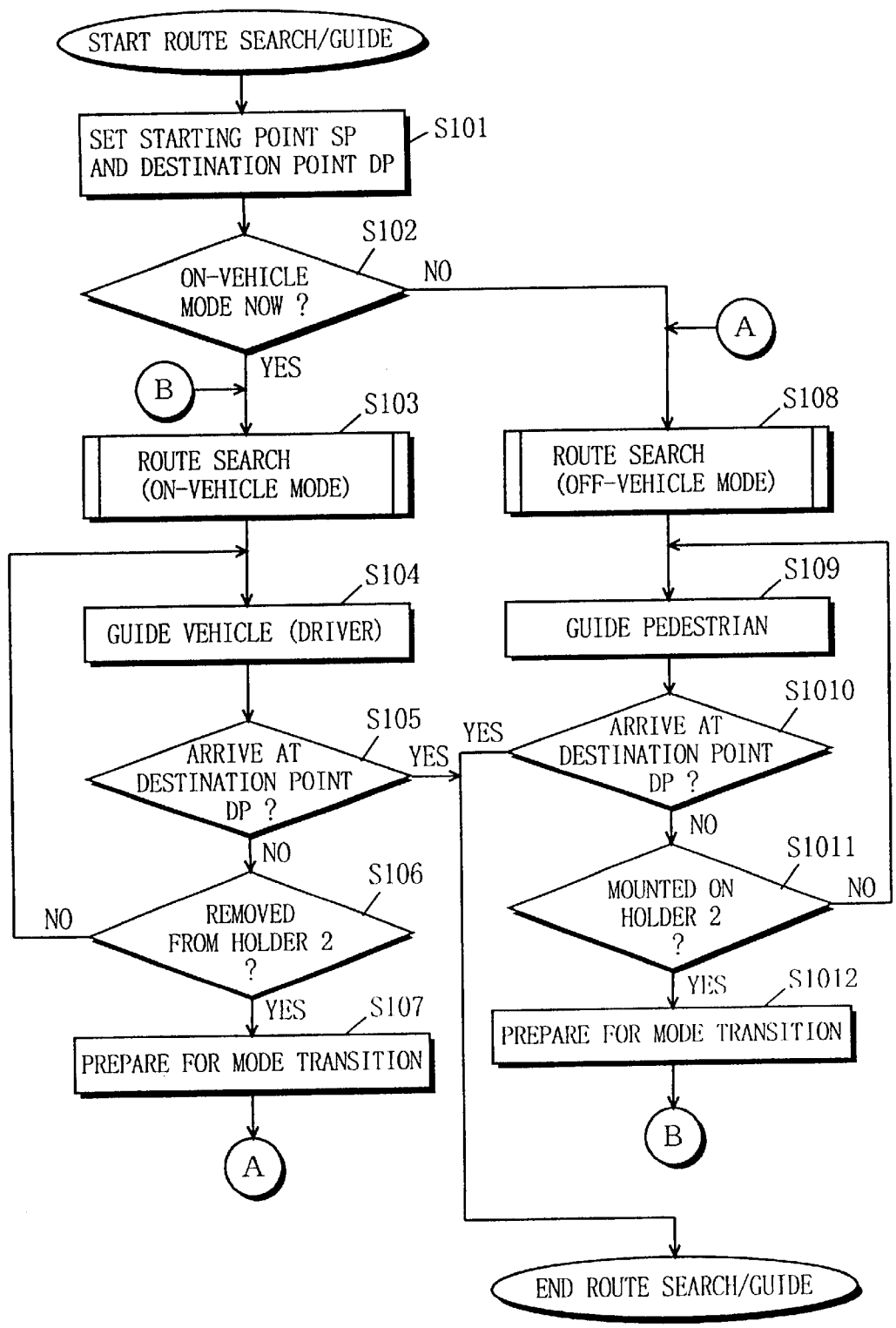
FIG. 10 is a flow chart showing a route search/guide procedure executed by a navigation device $N_2$.

In FIG. 10, similarly to steps S61 and S62 of FIG. 6, the CPU 11 sets the starting point SP and the destination point DP for route search, and then operates as the determination part in claims, determining the present operation mode is "on-vehicle mode" or not (steps S101 and S102). If "on-vehicle mode", the CPU 11 carries out a route search in on-vehicle mode (step S103). The detailed process in step S103 is similar to that shown in FIG. 7, which has been described in the first embodiment.

After step S103, similarly to step S64 of FIG. 6, the CPU 11 uses the generated route data $D_{R1}$ to guide the vehicle from the starting point SP to the destination point DP (step S104). The CPU 11 then estimates the present position of the vehicle, and determines whether the present position coincides with the destination point DP or not (step S105). If the present position coincides the destination point DP, the CPU 11 determines that the route guide is over, and the procedure of FIG. 10 ends.

On the other hand, if not coincident, the CPU 11 receives the detection signal $S_2$ from the detector 19 and, based thereon, determines whether the main device 1 has been removed from the holder 2 or not (step S106). If not removed, the CPU 11 regards that the operation thereof has to be continued in "on-vehicle mode", and the procedure returns to step S104 for vehicle guidance.

On the other hand, if determining in step S106 that the main device 1 has been removed from the holder 2, the CPU 11 regards that the operation mode has to be changed from "on-vehicle mode" to "off-vehicle mode", and prepares for mode transition (step S107). More specifically, the CPU 11 records, in the RAM 13, the position indicated by the positional data $D_P$ received from the receiver 17 as a new starting point SP, while not changing the destination point DP recorded in step S101 and holding it as it is. The CPU 11 also deletes the road network data $D_{NET}$ loaded for route search in "on-vehicle mode" from the RAM 13.

Next, the CPU 11 operates as one example of the navigation processing part in claims, carrying out route search for "off-vehicle mode" (step S108). The process in step S108 is similar to that shown in FIG. 8, which has been described in detail in the first embodiment. In short, the CPU 11 carries out a route search based on the new starting point SP recorded in step S107 and the destination point DP to construct the route data $D_{R2}$. The CPU 11 then guides the pedestrian from the starting point SP to the destination point DP in a similar manner to that in step S67 (step S109). The CPU 11 then determines whether the present position of the pedestrian coincides with the destination point DP or not (step S1010). If the present position coincides with the destination point DP, the CPU 11 regards that the guide is over, and the procedure of FIG. 10 ends.

On the other hand, if not coincident, the CPU 11 determines whether the main device 1 is mounted on the holder 2 or not based on the detection signal $S_2$ from the detector 19 (step S1011). If determining that the main device 1 is not mounted, the CPU 11 regards that the operation thereof has to be continued in "off-vehicle mode", and the procedure returns to step S109 for guiding the pedestrian.

On the other hand, if mounted, the CPU 11 regards that the operation mode is changed from "off-vehicle mode" to "on-vehicle mode", and prepares for "on-vehicle mode" (step S1012). More specifically, the CPU 11 records, in the RAM 13, the position indicated by the positional data $D_P$ received from the receiver 17 as a new starting point SP, while not changing the destination point DP recorded in step S101 and holding it as it is. The CPU 11 also deletes the road network data $D_{NET}$ loaded for route search in "off-vehicle mode" from the RAM 13. Then, the CPU 11 returns to step S103 for further process.

Referring back to step S102 of FIG. 10, if the operation mode is not "on-vehicle mode", the procedure goes to step S108 and thereafter for further process, which have been described in the first embodiment.

With the above described process of FIG. 10, the navigation device $N_2$ can search for a route suitable for the vehicle or pedestrian, even though the same starting point SP and the same destination point DP are set between the on-vehicle mode and off-vehicle mode, which is similar to the case of first embodiment.

Moreover, the navigation device $N_2$ can accurately detect the timing of mode transition in the main device 1, and carry out route search/guide for both vehicles and pedestrians.

Figure 11:
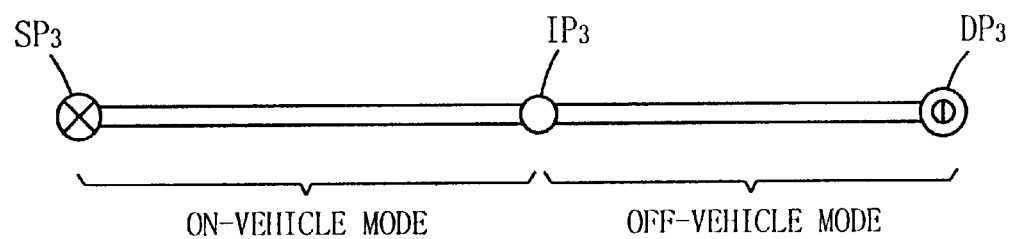
FIG. 11 is a diagram demonstrating one of technical effects of the navigation device $N_2$.

Now assume that, as shown in FIG. 11, a user travels by vehicle from a starting point $SP_3$ to an intermediate point $IP_3$ and then on foot from the intermediate point $IP_3$ to a destination point $DP_3$, with the help of route search/guide by the navigation device $N_2$. In this case, the main device 1 first operates in "on-vehicle mode", generating the route data $D_{R1}$ for a route from the starting point $SP_3$ to the destination point $DP_3$ for guiding the vehicle. When arriving at the intermediate point $IP_3$, the user removes the main device 1 from the holder 2, and heads for the destination point $DP_3$ on foot. The main device 1 detects that it has been removed from the holder 2, and changes the mode to "off-vehicle mode". The main device 1 then generates the route data $D_{R2}$ for a route from the intermediate point $IP_3$ to the destination point $DP_3$ for guiding the pedestrian (user). In this fashion, the navigation device $N_2$ can carry out appropriate route search/guide even if the user changes his/her transportation on the way from the starting point SP to the destination point DP.

In the above first and second embodiments, the CPU 11 determines whether the main device 1 has been removed from the holder 2 or not, based on the detection signal $S_2$ indicating whether an electrical connection has been established between the first terminal 18 and the second terminal 21. This is not restrictive, and the CPU 11 may make the above determination by using a mechanical or magnetic switch.

Figure 12:
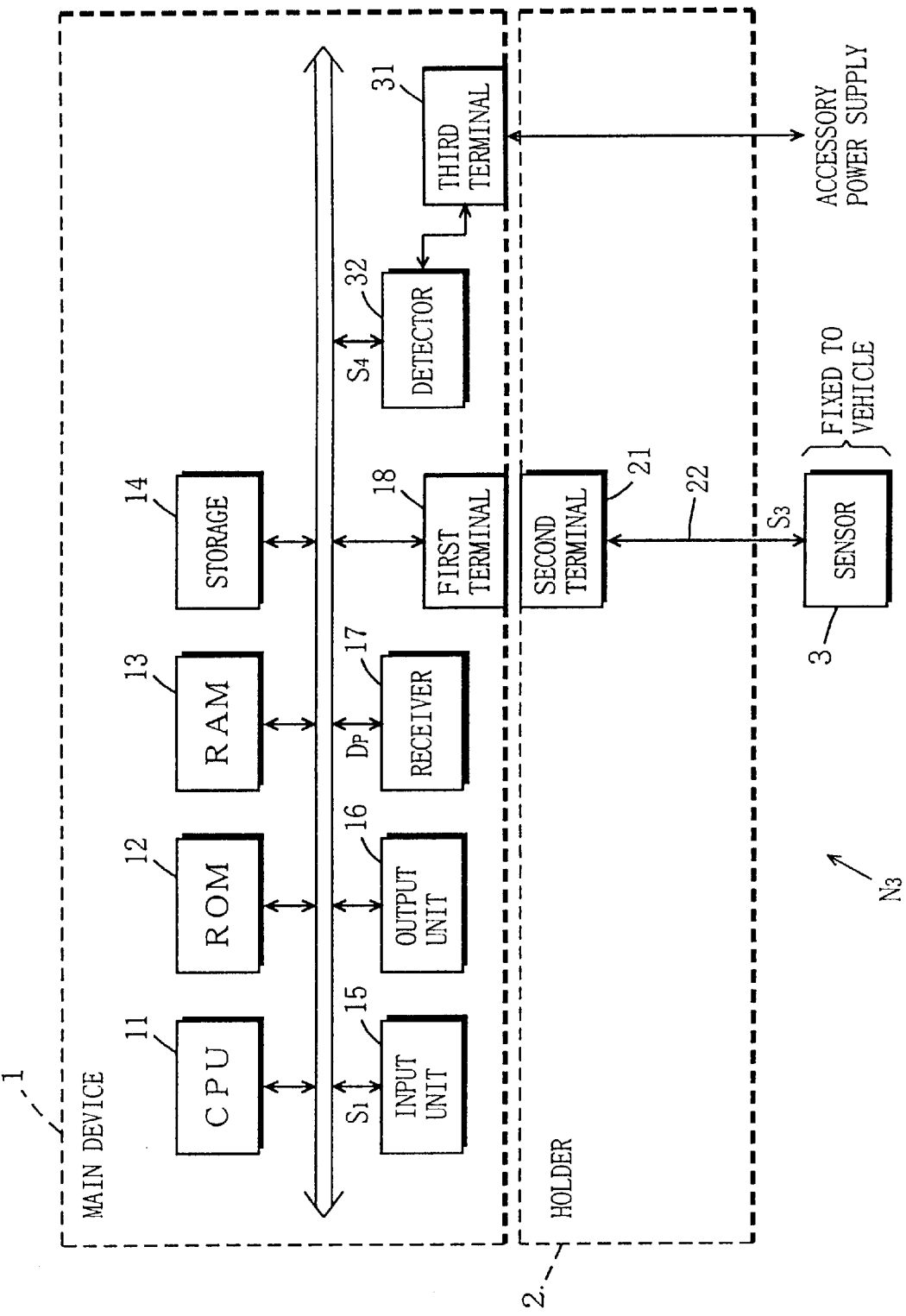
FIG. 12 is a block diagram showing the whole structure of a navigation device $N_3$.

With reference to FIG. 12, a navigation device $N_3$ according to a third embodiment of the present invention is described. The navigation device $N_3$ is different from the navigation device $N_2$ only in that a third terminal 31 is further provided and a detector 32 is provided in place of the detector 19. The other components in FIG. 12 are provided with the same reference numerals as those in FIG. 1, and are not described herein.

The third terminal 31 is a terminal for connecting the main device 1 and an accessory power supply. The accessory power supply is located outside the main device 1 and the holder 2, but fixed to a vehicle, supplying power to various components in the vehicle.

The detector 32 monitors the state of the third terminal 31 to detect whether the accessory power supply is powered on or off, and transmits a detection signal $S_4$ indicating the detection result to the CPU 11.

Figure 13:
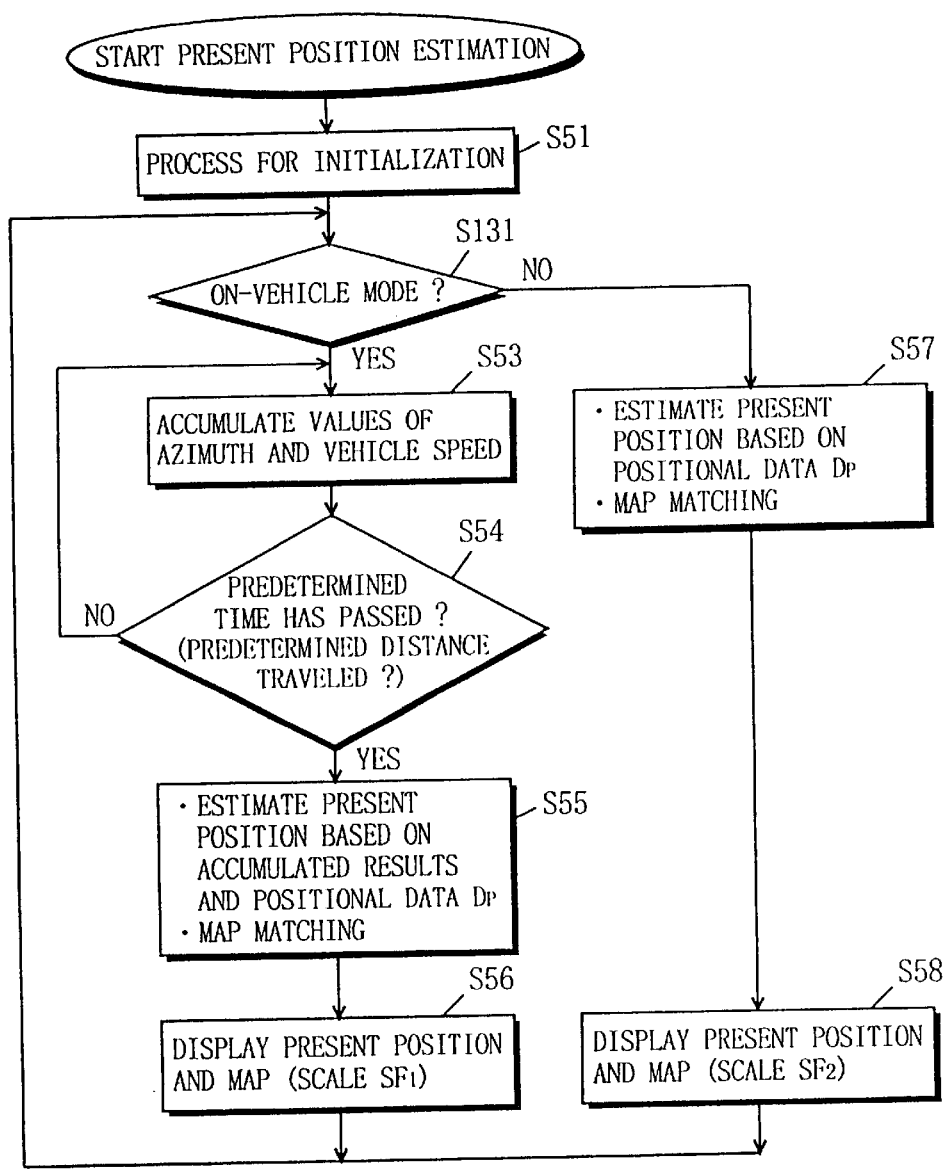
FIG. 13 is a flow chart showing a present position estimation procedure executed by the navigation device $N_3$.

With reference to a flow chart of FIG. 13, a present position estimating process in the navigation device $N_3$ is described. The procedure of FIG. 13 is different from that of FIG. 5 only in that step S131 is provided in place of step S52. The other steps are provided with the same step numbers as those of FIG. 5, and not described herein.

In FIG. 13, after step S51, the CPU 11 operates as one example of the determination unit in claims, receiving the detection signal $S_4$ from the detector 32 to determine whether the main device 1 operates in "on-vehicle mode" or not (step S131). More specifically, if it is known from the detection signal $S_4$ that the accessory power supply is powered on, the CPU 11 regards that the main device 1 is used insider the vehicle, and determines that it operates in "on-vehicle mode". On the other hand, if it is known from the detection signal $S_4$ that the accessory power supply is powered off, the CPU 11 regards that the main device 1 is used outside the vehicle, and determines that it operates in "off-vehicle mode". The operation thereafter has been already described with reference to FIG. 5.

Figure 14:
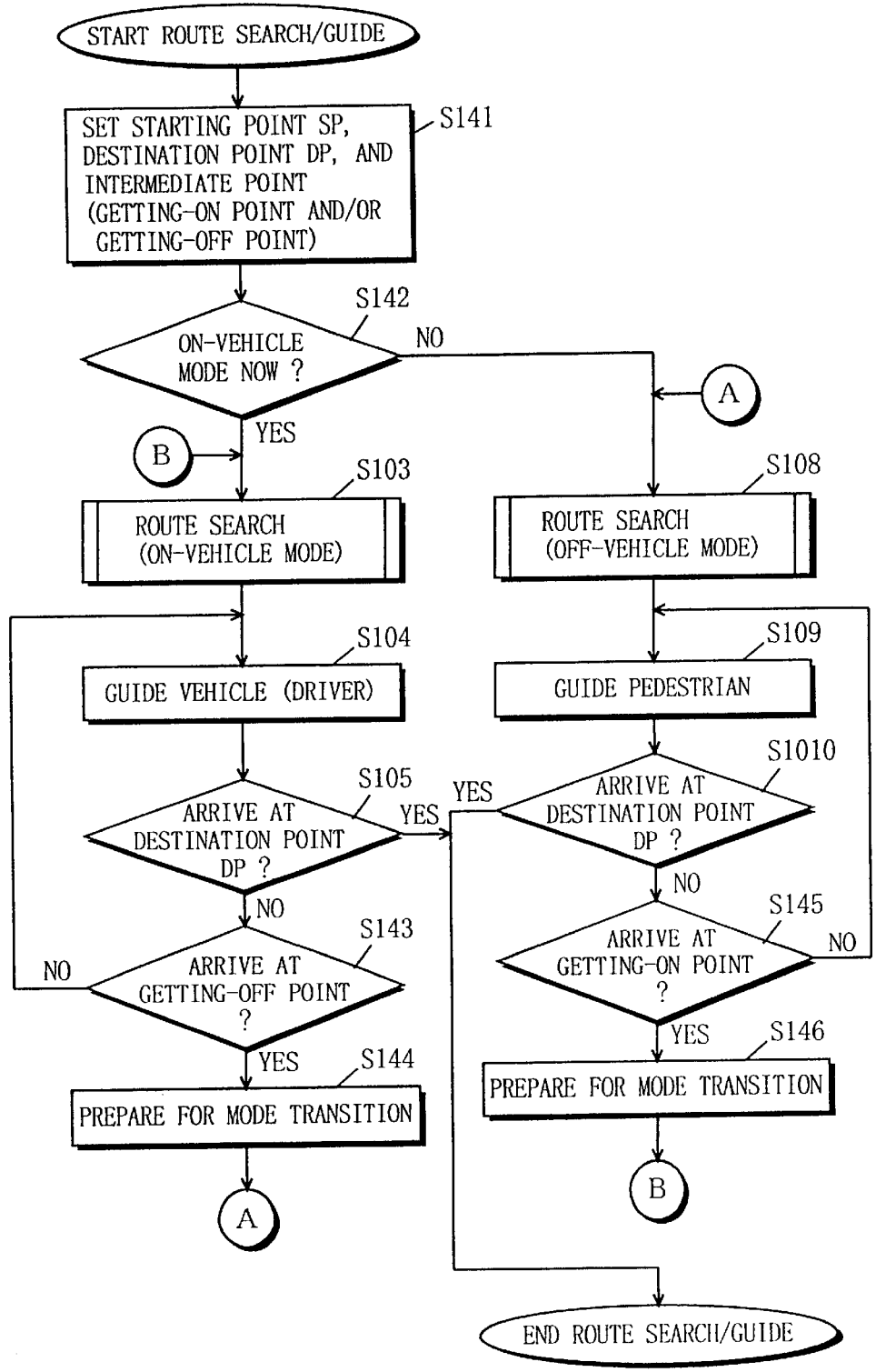
FIG. 14 is a flow chart showing a route search/guide procedure executed by the navigation device $N_3$.

With reference to a flow chart of FIG. 14, route search/guide in the navigation device $N_3$ is described. The procedure of FIG. 14 is different from that of FIG. 10 in that steps S141, S142, S143, S144, S145, and S146 are provided in place of steps S101, S102, S106, S107, S1011, and S1012, respectively. The other steps of FIG. 14 are provided with the same step number as those in FIG. 10, and not described herein.

In FIG. 14, the user typically operates the input unit 15 to specify the starting point SP, the destination point DP, and the intermediate point IP for searching a route. Here, the intermediate point IP is a point anywhere between the starting point SP and the destination point DP, the point where the user gets off the vehicle to travel on foot or where the user stops travelling on foot to get on the vehicle.

In response to the user's operation, the input unit 15 transmits the operation signal $S_1$ indicating the specified starting point SP, destination point DP, and intermediate point IP to the CPU 11. The CPU 11 writes the received starting point SP, destination point DP, and intermediate point IP in the RAM 13 (step S141).

The CPU 11 then receives the detection signal $S_4$ from the detector 32 to determine whether the present operation mode is "on-vehicle mode" or not (step S142). If "on-vehicle mode", the CPU 11 carries out a route search/guide in on-vehicle mode (steps S103 and S104). Then, if the present position of the vehicle does not coincide with the destination point DP (step S105), the procedure goes to step S143.

In step S143, the CPU 11 determines whether the present position of the vehicle coincides with the intermediate point IP (more strictly, getting-off point) or not. If not, coincident, the procedure exits from step S143 and returns to step S104 for further vehicle guidance.

Note that, if the CPU 11 determines that the present position coincides with the intermediate point IP, the procedure does not directly go to step S144. This is because the estimated present position includes some errors, and the user is not necessarily able to get off the vehicle at the estimated position even though it coincides with the intermediate point IP. Therefore, the CPU 11 first receives the detection signal $S_4$ from the detector 32 and, based thereon, determines whether the accessory power supply is powered on or not. If powered on, the CPU 11 determines that the vehicle goes on travelling, that is, the present position of the vehicle is not the intermediate point IP. The procedure then exits from step S143, and returns to step S104 for further vehicle guidance.

On the other hand, if receiving the detection signal $S_4$ indicating that the accessory power supply is powered off, the CPU 11 determines that the vehicle has been parked and the main device 1 is carried outside the vehicle, that is, the user got off the vehicle. The CPU 11 then prepares for mode transition to "off-vehicle mode" (step S144). More specifically, the CPU 11 records the intermediate point IP (getting-off point) set in step S141 in the RAM 13 as a new starting point SP, while holding the destination point DP recorded in RAM 13. The CPU 11 also deletes the road network data $D_{NET}$ loaded for route search in "on-vehicle mode" from the RAM 13.

The CPU then carries out route search/guide in off-vehicle mode (steps S108 and S109). If the present position of the pedestrian does not coincide with the destination point DP (step S1010), the procedure goes to step S145. In step S145, the CPU 11 determines whether the present position of the pedestrian coincide with the intermediate point IP (in this case, the point where the user gets on the vehicle; hereinafter referred to as getting-on point) or not (step S145). If not coincident, the procedure exits from step S145, and returns to step S109 for further pedestrian guidance.

Note that, for the same reason as that in step S143, the procedure does not directly go to step S146 even if the present position coincides with the intermediate point IP. In this case, the CPU 11 receives the detection signal $S_4$ from the detector 32. Based on the received detection signal $S_4$, the CPU 11 determines whether the accessory power supply is powered on or off. If powered off, the CPU 11 determines that the pedestrian is still outside the vehicle, that is, the present position of the pedestrian is not the intermediate point IP (getting-on point). The procedure then exits from step S145, and returns to step S109 for further pedestrian guidance.

On the other hand, if receiving the detection signal $S_4$ indicating that the accessory power supply is powered on, the CPU 11 regards that the user got on the vehicle and starts driving. Thus, the CPU 11 determines that the operation mode has to be changed to "on-vehicle mode", and prepares for mode transition (step S146).

More specifically, in step S146, the CPU 11 records the intermediate point IP (getting-on point) set in step S141 in the RAM 13 as a new starting point SP, while holding the destination point DP recorded in step S141 in the RAM 13 as it is. The CPU 11 also deletes the road network data $D_{NET}$ loaded for route search in "on-vehicle mode" from the RAM 13.

Referring back to step S142 of FIG. 14, if the operation mode is not "on-vehicle mode", the procedure goes to step S108 for further processing, which is clear from the above and not described herein.

With the above described process in FIG. 14, the navigation device $N_3$ can achieve the similar technical effects as those by the navigation device $N_2$.

In the above third embodiment, the CPU 11 determines whether the CPU 11 operates in "on-vehicle mode" or "off-vehicle mode" by determining whether the vehicle is driven or parked (whether the user uses the main device 1 inside or outside the vehicle) on the basis of the intermediate point IP set by the input unit 15 and whether the accessory power supply is powered on or off. This is not restrictive, and the above determination may be made on the basis of whether an ignition power supply of the vehicle is powered on or off, or whether a parking brake system thereof is released or not. In other words, any component that is fixed to the vehicle and is able to specify whether the vehicle is parked or not may be used for the above determination.

Figure 15:
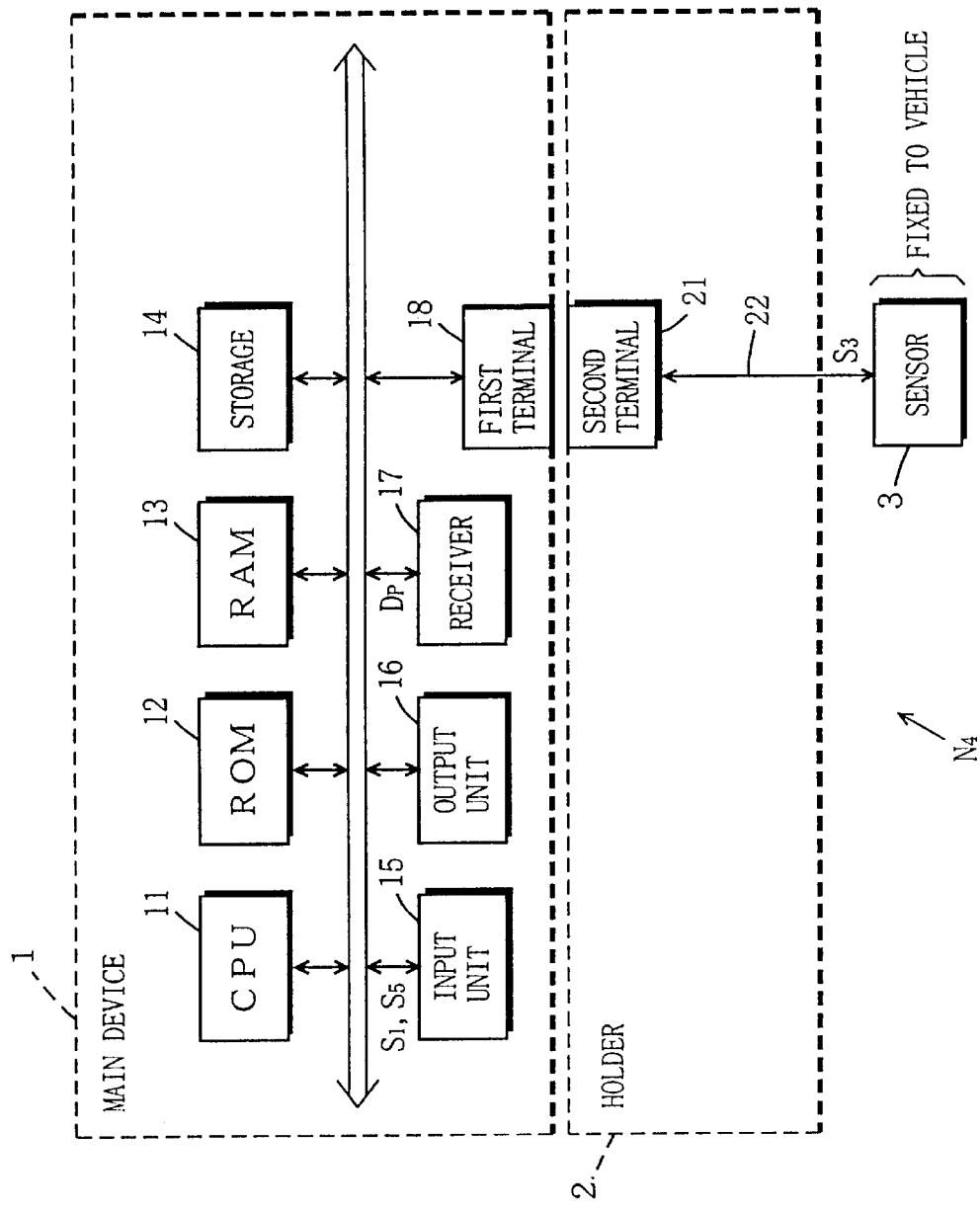
FIG. 15 is a block diagram showing the whole structure of a navigation device $N_4$.

With reference to FIG. 15, a navigation device $N_4$ according to a fourth embodiment of the present invention is described. In FIG. 15, the navigation device $N_4$ is similar in structure to the navigation device $N_1$ of FIG. 1, but different only in that the detector 19 is not provided. Also, the input unit 15 of FIG. 15 is similar in operation to that of FIG. 1, but different in that it generates an operation signal $S_5$, which will be described below, for transmission to the CPU 11. The other components in FIG. 15 are provided the same reference numerals as those in FIG. 1, and are not described herein. As to processing, the navigation device $N_4$ is different from the navigation device $N_1$ in estimation of the present position and route search/guide.

Figure 16:
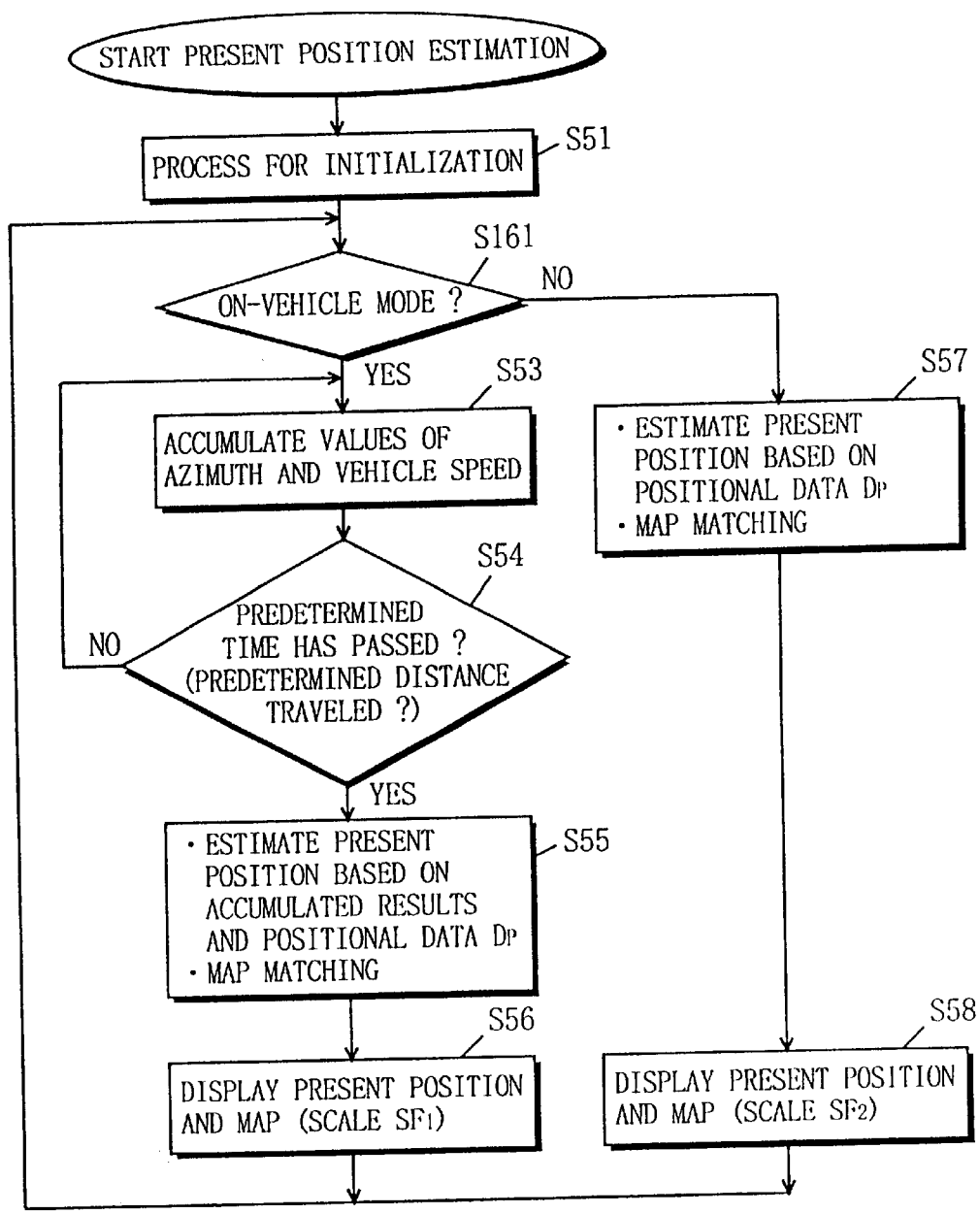
FIG. 16 is a flow chart showing a present position estimation procedure executed by the navigation device $N_4$.

With reference to a flow chart of FIG. 16, a present position estimating process in the navigation device $N_4$ is described. The procedure of FIG. 16 is different from that of FIG. 5 only in that step S161 is provided in place of step S52. Therefore, the steps of FIG. 16 are provided with the same step numbers as those in FIG. 5, and not described herein.

Immediately after being powered on, the navigation device $N_4$ starts the present position estimating process shown in FIG. 16. In other words, the navigation device $N_4$ does not have to carry out the mode setting process as shown in FIG. 4. In FIG. 16, after step S51, the CPU 11 operates as one example of the determination unit in claims, determining whether the operation thereof is "on-vehicle mode"

or "off-vehicle mode", based on a detection signal $S_5$ received from the input unit 15 (step S161).

Now, step S161 is more specifically described. The navigation device $N_4$ is designed in advance so that the input unit 15 is operated by the user for setting or switching the operation mode between "on-vehicle mode" and "off-vehicle mode". In response to the user's operation, the input unit 15 generates one of two types of signals. One is an operation signal $S_{51}$ indicating that the user is inside the vehicle. The other is an operation signal $S_{52}$ indicating that the user is outside the vehicle. In step S161, the CPU 11 first requests the user to set the operation mode. In response to the request by the navigation device $N_4$, the user operates the input unit 15 to tell that he/she is inside or outside the vehicle. In response to the user's operation, the input unit 15 generates either the operation signal $S_{51}$ or $S_{52}$ for transmission to the CPU 11. When receiving the operation signal $S_{51}$, the CPU 11 operates in "on-vehicle mode", executing steps S53 through S56. When receiving the operation signal $S_{52}$, the CPU 11 operates in "off-vehicle mode", executing steps S57 through S58.

Figure 17:
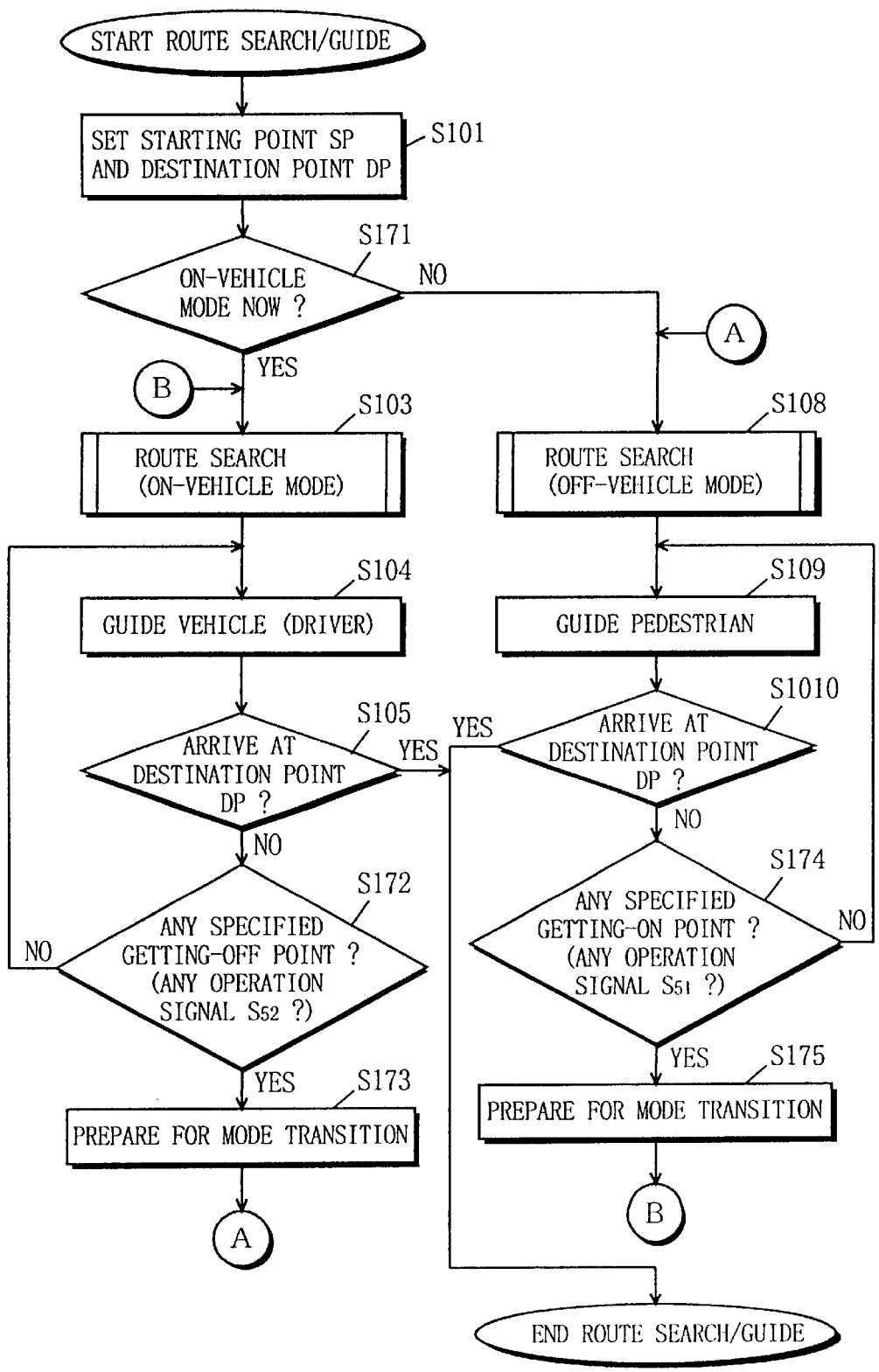
FIG. 17 is a flow chart showing a route search/guide procedure executed by the navigation device $N_4$.

With reference to a flow chart of FIG. 17, a route search/guide process in the navigation device $N_4$ is described. The procedure of FIG. 17 is different from that of FIG. 10 only in that steps S171, S172, S173, S174, and S175 are provided in place of steps S102, S106, S1011, and S1012, respectively. The other steps in FIG. 17 are provided with the same step numbers as those in FIG. 10, and not described herein.

In FIG. 17, the CPU 11 operates as one example of the determination unit in claims, determining whether it operates in "on-vehicle mode" or not, based on the received operation signal $S_5$ (step S171). Note that the operation mode has been specified in the present position estimating process of FIG. 16. Therefore, unlike in step S161, the CPU 11 does not have to request in step S171 the user to set the operation mode. In other words, the determination in step S171 maybe made on the basis of the operation signal $S_5$ received in step S161.

Also note that the user operates the input unit 15 at his/her will if he/she wants to use the main device 1 outside the vehicle. In response to such user's operation, the input unit 15 transmits the operation signal $S_{52}$ to the CPU 11. If receiving the operation signal $S_{52}$ in step S171, the CPU 11 determines to execute the following route search/guide process in off-vehicle mode, even though the operation mode has been set in step S161 as on-vehicle mode. Conversely, if the user wants to use the main device 1 inside the vehicle, the user operates the input unit 15 at his/her will, and the CPU 11 receives the operation signal $S_{51}$ from the input unit 15. In this case, the CPU 11 determines to execute the following process in on-vehicle mode, even though the operation mode has been set in step S161 as off-vehicle mode.

If determining to operate in "on-vehicle mode", the CPU 11 carries out a route search/guide in on-vehicle mode (steps S103 and S104). If the present position of the vehicle does not coincide with the destination point DP (step S105), the procedure goes to step S172. In step S172, the CPU 11 determines whether it receives the operation signal $S_{52}$ from the input device 15. If not received, the procedure returns to step S104 for further vehicle guidance.

While the main device 1 operates in on-vehicle mode, the user can operate the input unit 15 to tell that he/she got off the vehicle. Consequently, the operation signal $S_{52}$ is transmitted to the CPU 11. If receiving the operation signal $S_{52}$ in step S172, the CPU 11 determines that the getting-off point is specified and the operation is to be performed in off-vehicle mode, and prepares for mode transition (step S173). More specifically, the CPU 11 records the present point, that is, the point where the user gets off the vehicle (getting-off point), in the RAM 13 as a new starting point SP, while holding the destination point DP recorded in step S141 as it is. The CPU 11 also deletes the road network data $D_{NET}$ read for route search in "on-vehicle mode" from the RAM 13.

After step S173, the CPU 11 carries out a route search/guide in off-vehicle mode (steps S108 through S1010). If in step S1010, the present position of the pedestrian does not coincide with the destination point DP, the CPU 11 determines whether it receives the operation signal $S_{51}$ from the input unit 15 or not (step S174). If not received, the CPU 11 determines to still operate in off-vehicle mode. The procedure then returns to step S109 for further pedestrian guidance.

If received in step S174, the CPU 11 determines that the getting-on point is specified and the operation is to be performed in non-vehicle mode, in reverse to the above step S173, and prepares for mode transition (step S175). More specifically, the CPU 11 records the estimated present position, that is, getting-on point, in the RAM 13 as a new starting point SP, while holding the destination point DP recorded in step 101 as it is. The CPU 11 also deletes the road network data $D_{NET}$ loaded for route search in "off-vehicle mode" from the RAM 13. After step S175, the procedure returns to step S103 for route search in on-vehicle mode.

Referring back to step S171 of FIG. 17, if the operation mode is not "on-vehicle mode", the procedure goes to step S108 for further processing. The processing is evident from the above description, and therefore not described herein.

With the above described process of FIG. 17, the navigation device $N_4$ can achieve the similar technical effects as those by the navigation device $N_2$.

Figure 18:
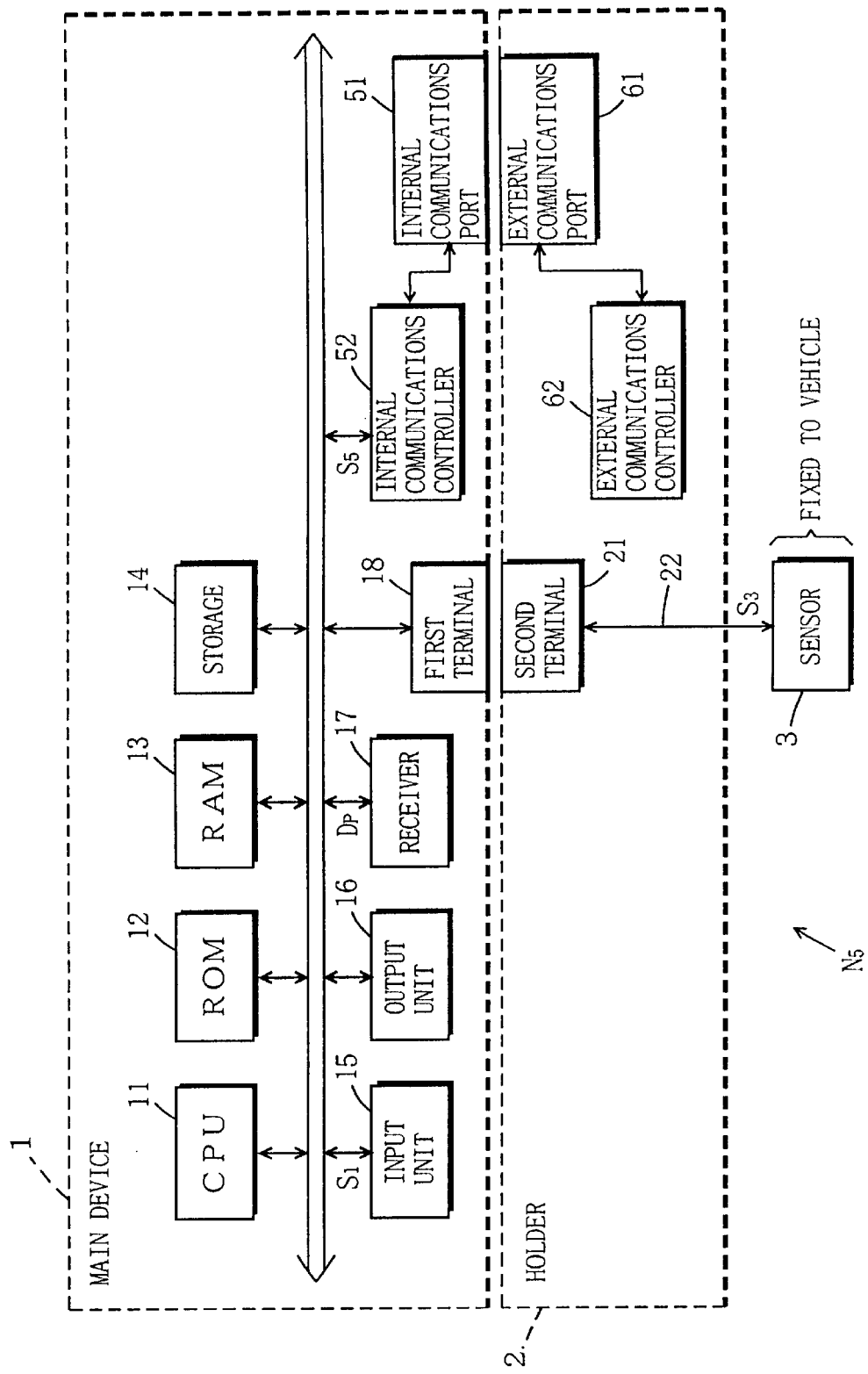
FIG. 18 is a block diagram showing the whole structure of a navigation device $N_5$.

FIG. 18 is a block diagram showing the whole structure of a navigation device $N_5$ according to a fifth embodiment of the present invention. In FIG. 18, the navigation device $N_5$ includes, like the navigation device $N_1$, the main device 1, the holder 2, and the sensor 3.

Like the navigation device $N_1$, the main device 1 of the navigation device $N_5$ includes the CPU 11, the ROM 12, the RAM 13, the storage 14, the input unit 15, the output unit 16, the receiver 17, and the first terminal 18. The main device 1 of the navigation device $N_5$ further includes an internal communications port 51 and an internal communications controller 52.

The internal communications controller 52 controls, through the internal communications port 51, communications with the holder 2 side. Between the main device 1 and the holder 2, infrared or radio-wave communications take place. The internal communications controller 52 also generates a notification signal $S_6$ for transmission to the CPU 11. More specifically, the internal communications controller 52 generates and transmits, as required, a notification signal $S_{61}$ notifying the CPU 11 that infrared rays or radio waves from the holder 2 are receivable. If these are not receivable, that is, if the CPU 11 cannot communicate with the holder 2 side, the internal communications controller 52 generates, as required, a notification signal $S_{62}$ indicating as such for transmission to the CPU 11.

The holder 2 is similar to that of the other embodiments in that the second terminal 21 and the wiring 22 are provided, but different therefrom in that an external communications port 61 and an external communications controller 62 are provided.

The external communications controller 62 controls, through the external communications port 61, infrared or radio-wave communications with the main device 1 side. More specifically, the external communications controller 62 sends, through the external communications port 61, infrared rays or radio waves to the internal communications port 51. As for the radio waves, electric power for transmission of the internal communication port 51 takes a value capable of substantially covering inside the vehicle or its adjacent area.

Figure 19:
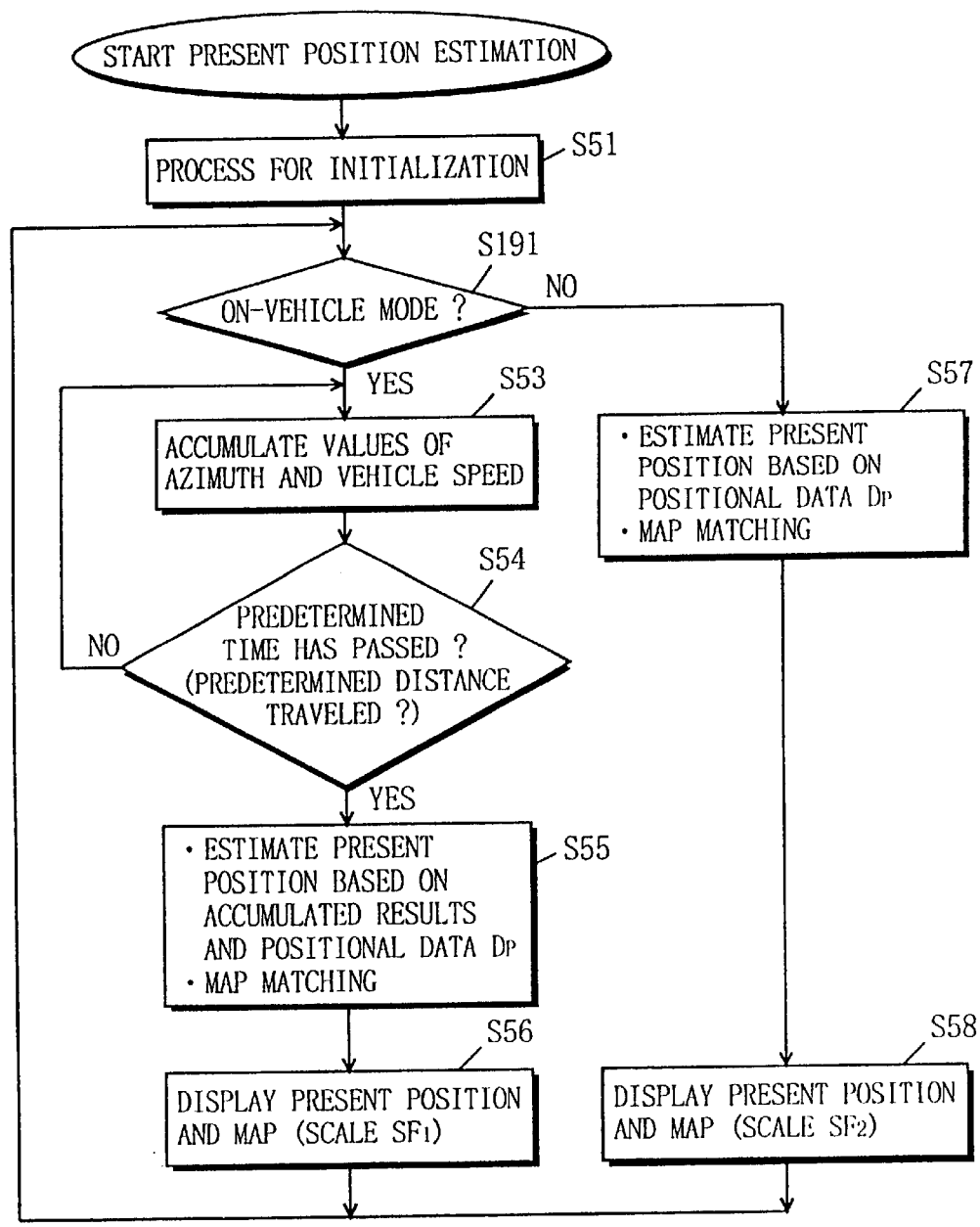
FIG. 19 is a flow chart showing a present position estimation proceed executed by the navigation device $N_5$.

The above structured navigation device $N_5$ executes estimation of the present position and route search/guide as described below, but does not have to carry out the mode setting as the navigation device $N_1$. First, with reference to a flow chart of FIG. 19, a present position estimating process is described. The procedure of FIG. 19 is different from that of FIG. 15 only in that step S191 is provided in place of step S52. Therefore, the other steps in FIG. 19 are provided with the same step numbers as those in FIG. 5, and not described herein. In FIG. 19, the navigation device $N_5$ first carries out initialization (step S51).

The CPU 11 then receives the notification signal $S_6$ from the internal communications controller 52. Based on the notification signal $S_6$, the CPU 11 determines whether to operate in "on-vehicle mode" or "off-vehicle mode" (step S191). As stated above, the internal communications controller 52 transmits the notification signal $S_{61}$ if the main device 1 can communicate with the holder 2 side. If receiving such notification signal $S_{62}$, the CPU 11 can regard that the main device 1 in the vicinity of the holder 2. In other words, the CPU 11 regards that the main device is inside the vehicle at this moment, and determines to operate in "on-vehicle mode". Thereafter, the CPU 11 executes steps S53 through S56.

On the other hand, if the notification signal $S_{62}$ is received indicating that the main device 1 cannot communicate with the holder 2 side, the CPU 11 regards that the main device 1 is not insider the vehicle, and determines to operate in "off-vehicle mode". Thereafter, the CPU 11 executes steps S57 and S58.

Figure 20:
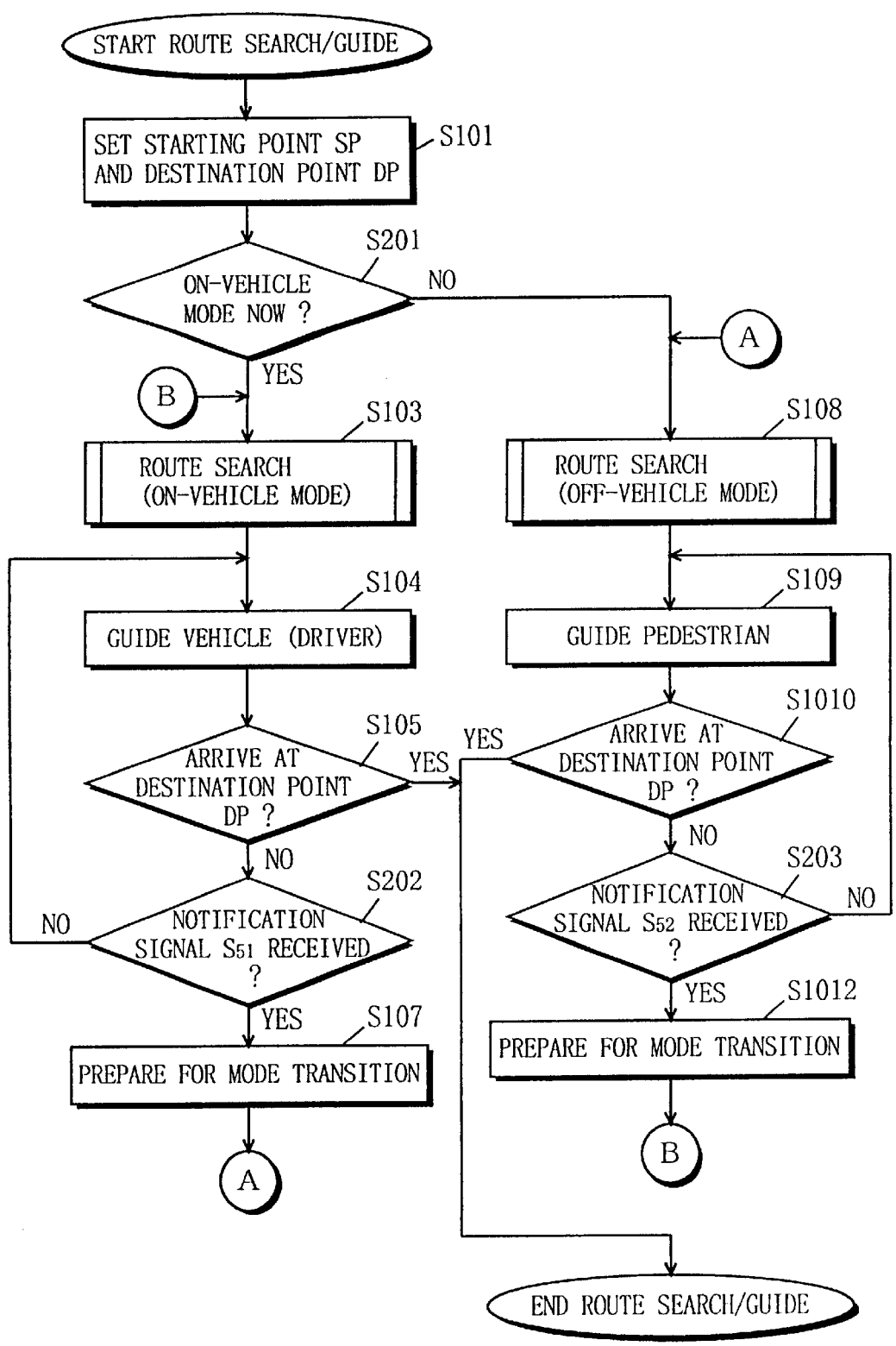
FIG. 20 is a flow chart showing a route search/guide procedure executed by the navigation device $N_5$.

With reference to a flow chart of FIG. 20, a route search/guide process is described. The procedure of FIG. 20 is different from that of FIG. 10 in that steps S201, S202, and S203 are provided in place of steps S102, S106, and S1011, respectively. The other steps in FIG. 20 are provided with the same step numbers as those in FIG. 10, and not described herein.

In FIG. 20, after step S101, the CPU 11 determines in step S201 whether to operate in "on-vehicle mode" or not, in a similar manner to that in step S191 of FIG. 19. If "on-vehicle mode", the CPU 11 carries out a route search/guide in on-vehicle mode (steps S103 and S104). If the present position of the vehicle does not coincide with the destination point DP (step S105), the procedure goes to step S202.

In step S202, the CPU 11 receives the notification signal $S_6$ from the internal communication controller 52 to determine whether to change the mode to "off-vehicle mode" or not, in a similar manner to that in step S191. If the notification signal $S_{61}$ is received, the CPU 11 regards that the operation has to be continued in "on-vehicle mode". The procedure then returns to step S104 for further vehicle guidance. On the other hand, if the notification signal $S_{62}$ is received, the CPU 11 regards that the operation mode has to be changed from "on-vehicle mode" to "off-vehicle mode", and prepares for mode transition (step S107).

The CPU 11 then carries out a route search/guide in off-vehicle mode (steps S108 and S109). In step S1010, if the present position of the pedestrian does not coincide with the destination point DP, the CPU 11 receives the notification signal $S_6$ from the internal communications controller 52 and, based thereon, determines whether to change the mode to "off-vehicle mode" (step S203). If the notification signal $S_{62}$ is received, the CPU 11 regards that the main device 1 still has to operate in "off-vehicle mode". The procedure then returns to step S109 for further pedestrian guidance. On the other hand, if the notification signal $S_{61}$, is received the CPU 11 regards that the operation mode has to be changed from "off-vehicle mode" to "on-vehicle mode", and prepares for mode transition (step S1012).

Referring back to step S201 of FIG. 20, if determining to operate in "off-vehicle mode", the procedure goes to step S108 for further processing. Such processing is evident from the above, and not described herein.

With the above process of FIG. 20, the navigation device $N_5$ can achieve similar technical effects to those by the navigation device $N_2$.

In the second embodiment, the storage 14 is incorporated in the main device 1, and often implemented as a DVD-ROM drive or the like, which is large and heavy. This leads the whole navigation device $N_2$ to become hardly portable for the user. Therefore, an object of a sixth embodiment described below is to achieve an easily portable navigation device $N_6$.

Figure 21:
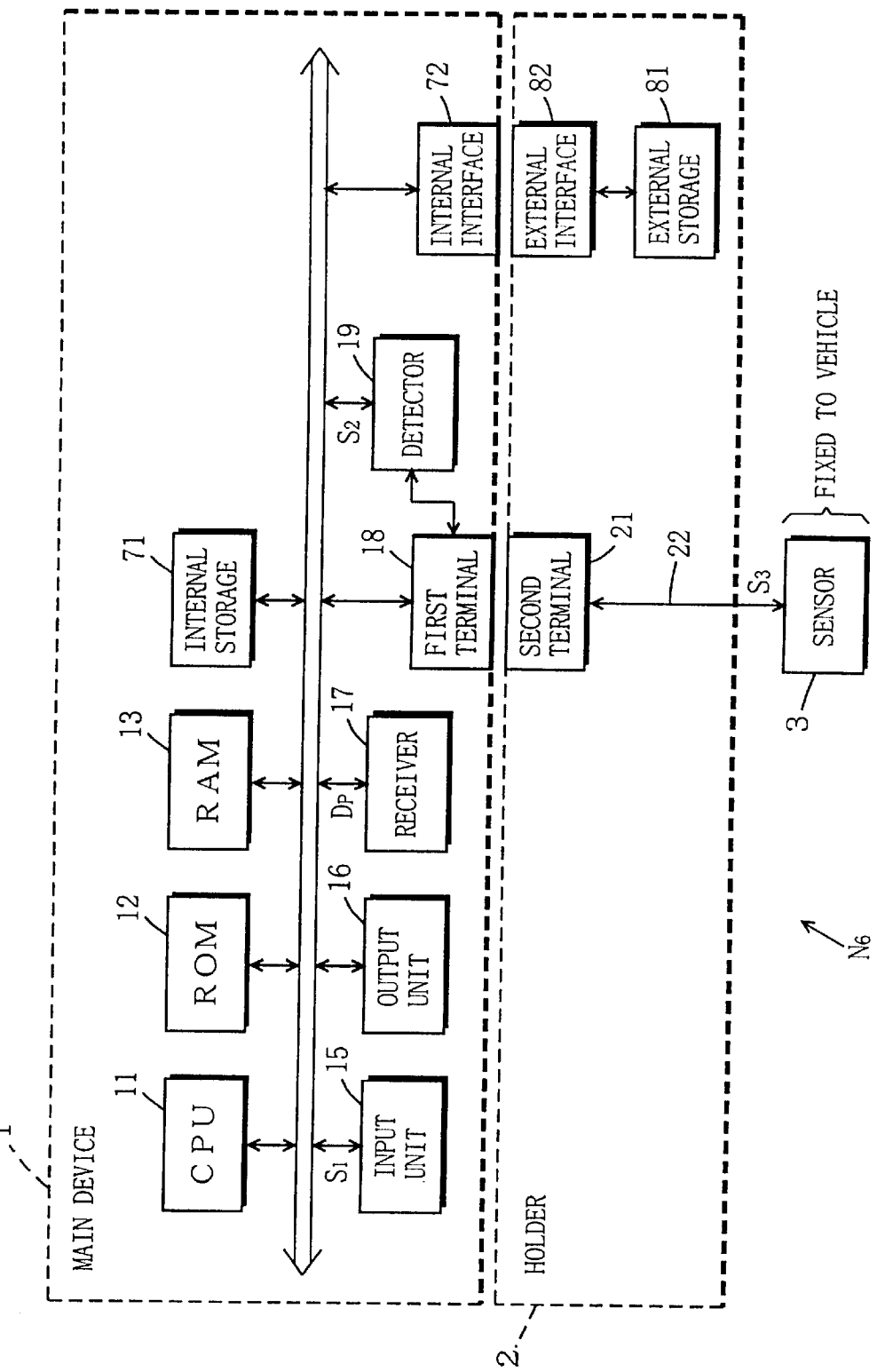
FIG. 21 is a block diagram showing the whole structure of a navigation device $N_6$.

FIG. 21 is a a block diagram showing the whole structure of the navigation device $N_6$. In FIG. 21, the navigation device $N_6$ includes, like the navigation device $N_2$, the main device 1, the holder 2, and ,the sensor 3.

The main device 1 of FIG. 21 is different from that of FIG. 1 only in that an internal storage 71 and an internal interface 72 are provided in place of the storage 14. The other components of the main device 1 in FIG. 21 are provided with the same reference numerals as those in FIG. 1, and not described herein.

The internal storage 71 is structured by a storage which is relatively light and small. Such storage is typically a memory card containing a solid-state memory removable from the main device 1, such as Smartmedia, memorystick, SD card (all of them are trademarks).

The internal interface 72 is connected to an external interface 82 provided on the holder 2 side so that the main device 1 can communicate with an external storage 81 provided on the holder 2 side.

The holder 2 of FIG. 21 is different from that of FIG. 1 in that the external storage 81 and the external interface 82 are further provided. The other components of the holder 2 in FIG. 21 are provided with the same reference numerals as those in FIG. 1, and not described herein.

The external storage 81 is typically implemented as a CD drive, DVD drive, or hard disk drive, storing various data required for navigation. The external storage 81 stores in advance the cartographic database $DB_{CART}$ described in the first embodiment and the road network data $D_{NET}$.

The external interface 82 is so structured as to be able to connect to the internal interface 72 on the main device 1 side. With this connection, the external storage 81 can transfer data to the main device 1 through the internal and external interfaces 72 and 82.

Figure 22:
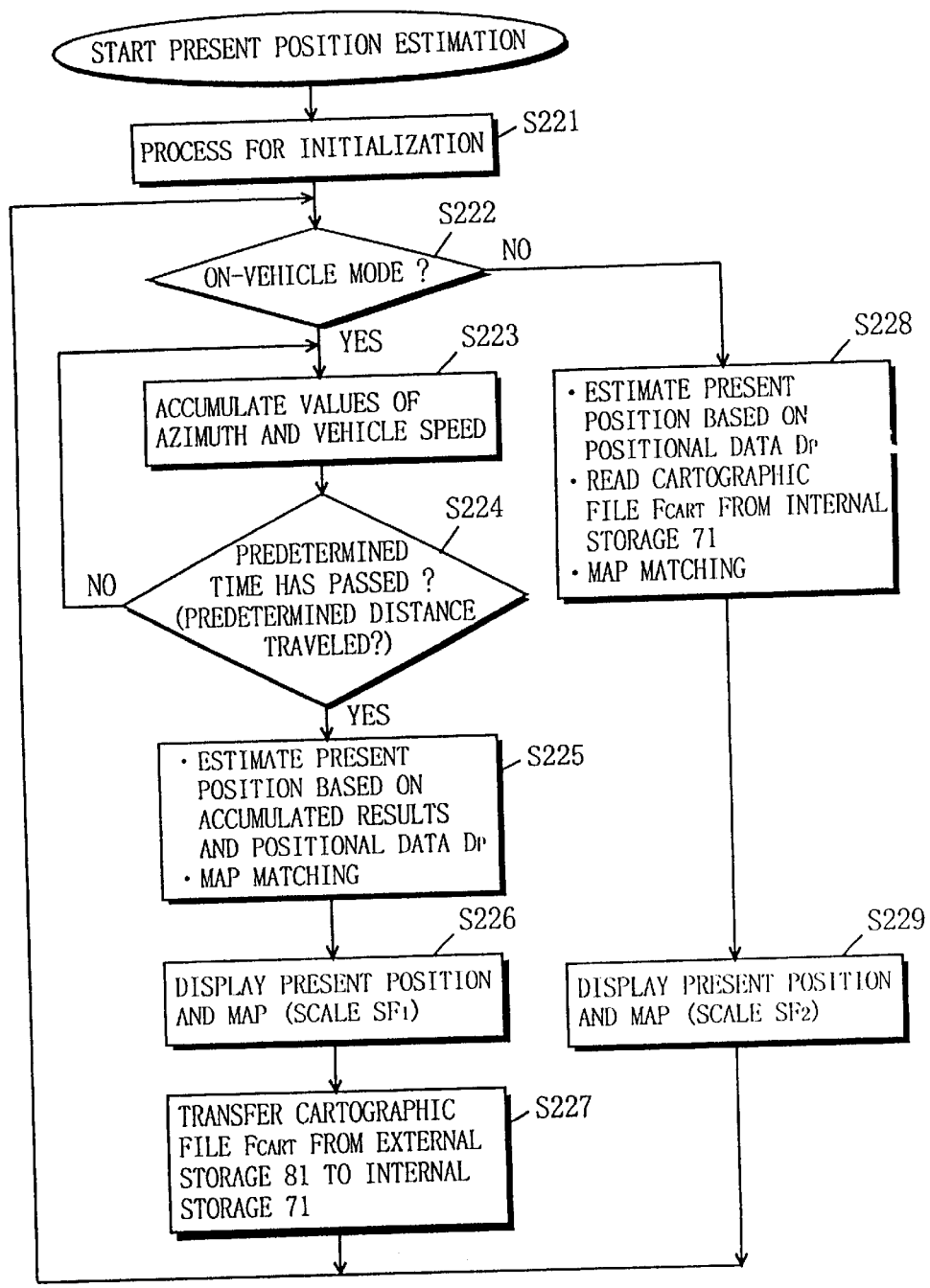
FIG. 22 is a flow chart showing a present position estimation procedure executed by the navigation device $N_6$.
Figure 23:
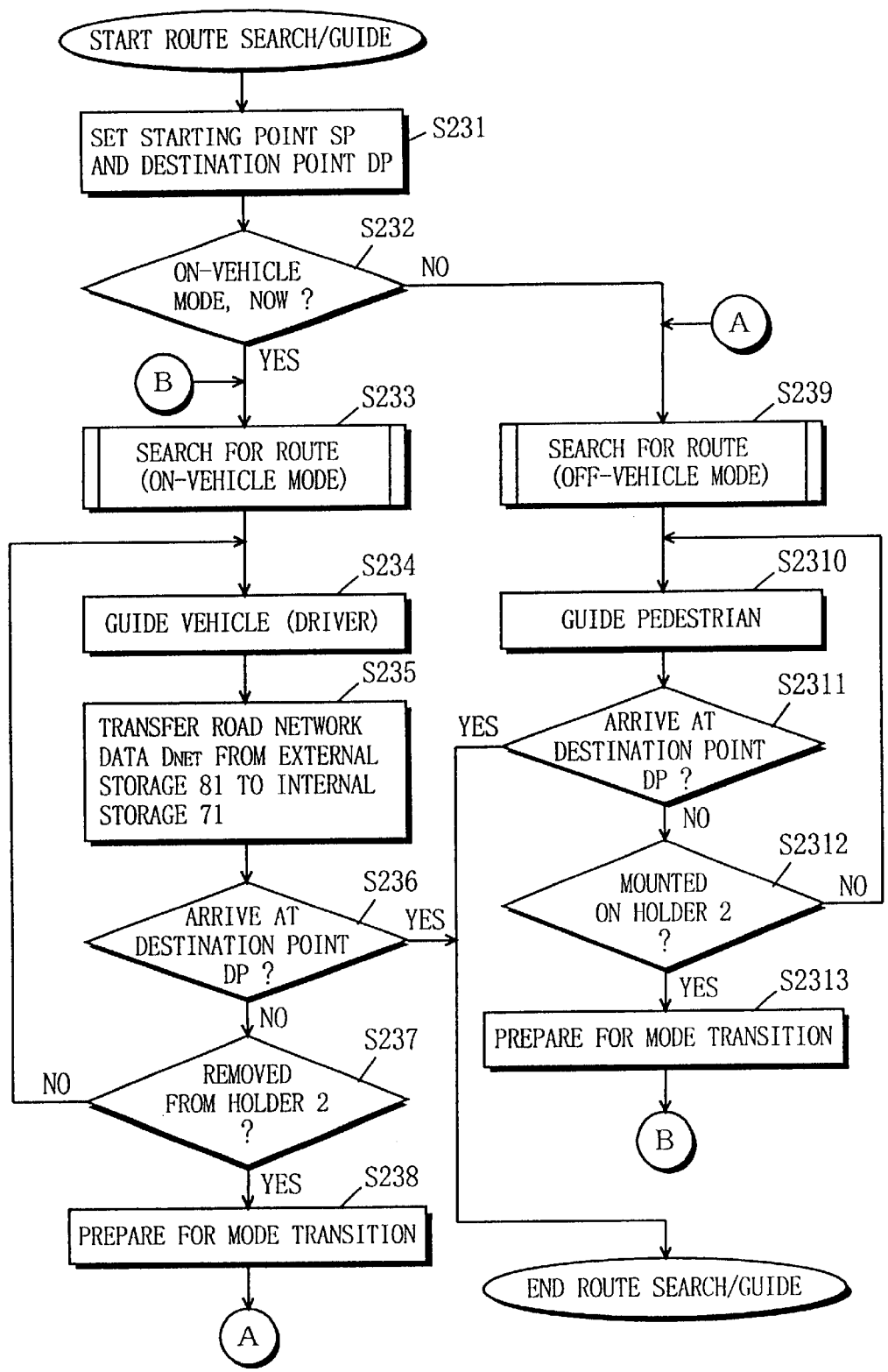
FIG. 23 is a flow chart showing a route search/guide procedure-executed by the navigation device $N_6$.
Figure 24A:
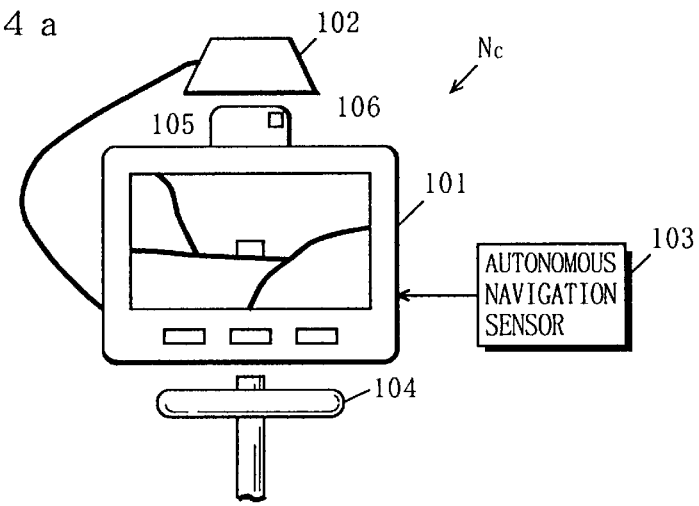
FIG. 24a is a diagram showing the structure of a conventional navigation device $N_c$.
Figure 24B:
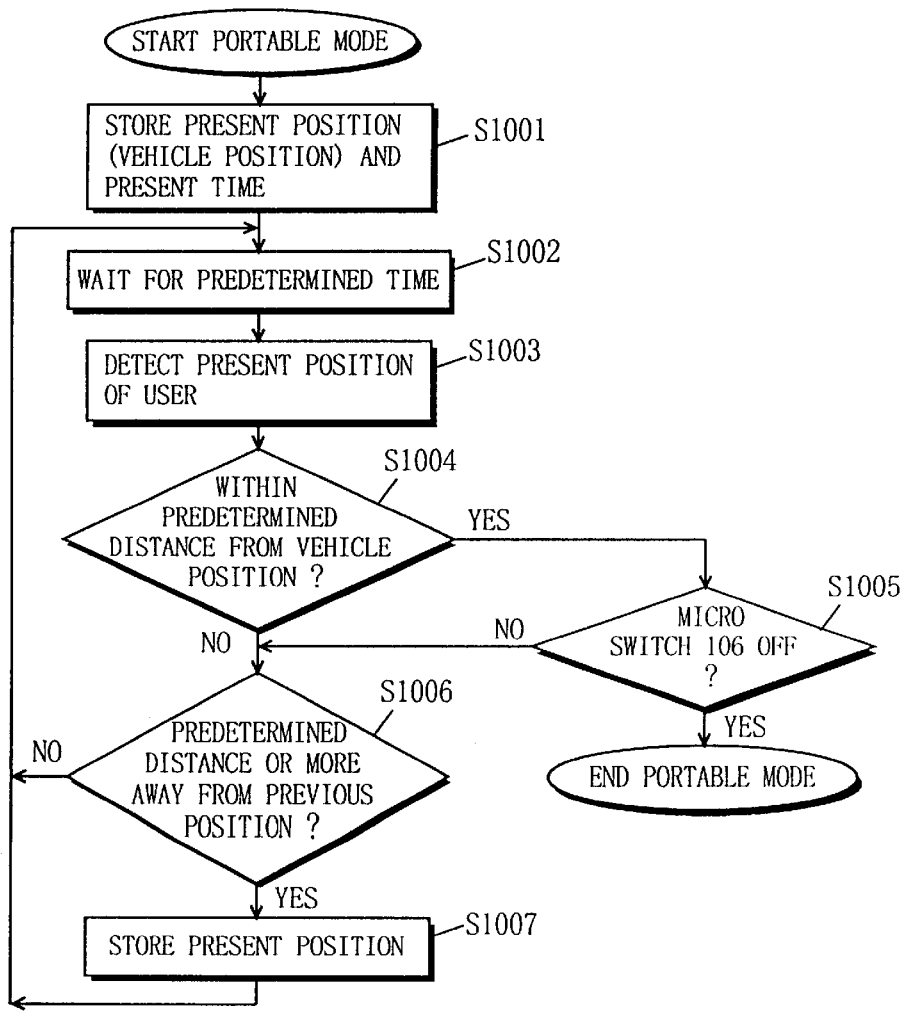
FIG. 24b is a flow chart showing one operation of the conventional navigation device $N_c$.

With reference to FIGS. 22 and 23, a present position estimating process and a route search/guide process in the navigation device $N_6$ are described. First, in FIG. 22, the CPU 11 carries out initialization (step S221) in a similar manner to that in step S51 (refer to FIG. 5). The CPU 11 then receives the detection signal $S_2$ from the detector 19 and, based thereon, determines whether the main device 1 is mounted on the holder 2 or not, thereby determining whether to operate in "on-vehicle mode" or "off-vehicle mode" (step S222).

If operating in "on-vehicle mode", the CPU 11 accumulates the values of azimuth and vehicle speed of the traveling vehicle (step S223), in a similar manner to that in step S53. The CPU 11 then determines whether the predetermined time has passed since the previous estimation of the present position (step S224), in a similar manner to that in step S54. If passed (or if vehicle has traveled the predetermined distance), the CPU 11 receives the positional data $D_P$ from the receiver 17. The CPU 11 then estimates the present position of the main device 1 based on the accumulation results of azimuth and vehicle speed in step S223 and the position indicated by the positional data $D_P$, in a similar manner to that in step S55. The CPU 11 also carries out map matching to match the estimated present position on the road of the cartographic file $F_{CART}$ read in the RAM 13 (step S225). The CPU 11 then makes the output unit 16 display the estimated present position and its adjacent area map represented by the cartographic file $F_{CART}$ (scaling factor $SF_1$) (step S226).

The CPU 11 then reads in advance the cartographic file $F_{CART}$ representing an area adjacent to the present position with the scaling factor $SF_2$ from the external storage 81 into the internal storage 71 (step S227). The cartographic file $F_{CART}$ read in step S227 represents a map of a relatively small area centering on the estimated present position, and, more specifically, an area where people can presumably walk about within a predetermined short time and a predetermined short distance. Step S227 does not have to be carried out every time after step S226, and may be skipped as required. In on-vehicle mode, the above steps S227 through S227 are repeatedly executed.

Referring back to step S222, if the operation mode is not "off-vehicle mode", it can be assumed that the user removes the main device 1 from the holder 2 and uses it outside the vehicle. Therefore, the CPU 11 receives the positional data $D_P$ from the receiver 17, and reads the cartographic file $F_{CART}$ from the external storage 71 into the RAM 13. The CPU 11 then matches the present position of the pedestrian indicated by the received positional data $D_P$ on the road of the map represented by the cartographic file $F_{CART}$ on the RAM 13 (step S228).

The CPU 11 then makes the output unit 16 display the present position and the map represented by the cartographic file $F_{CART}$ with the scaling factor $SF_2$ (step S229). In off-vehicle mode, the above steps S222→S228→S229 are repeatedly executed.

In FIG. 23, the CPU 11 sets the starting point SP and the destination point DP (step S231), in a similar manner to that in step S101. The CPU 11 then determines whether the operation mode is "on-vehicle mode" or "off-vehicle mode" (step S232), in a similar manner to that in step S102. If "on-vehicle mode", the CPU 11 carries out a route search in on-vehicle mode, and then guides the vehicle based on the generated route data $D_{R1}$ (steps S233 and S234), in a similar manner as that in steps S103 and S104.

The CPU 11 then reads in advance the road network data $D_{NET}$ representing the area adjacent to the estimated present position to prepare for future mode transition to "off-vehicle mode" (step S235). The road network $D_{NET}$ read in step S235 represents a relatively small area centering on the estimated present position (an area where people can presumably walk about within a predetermined short time and a predetermined short distance), and corresponds to the road network represented by the cartographic file $F_{CART}$ with scaling factor $SF_2$. The CPU 11 then determines whether the estimated present position coincides with the destination point DP or not (step S236). If coincident, the CPU 11 determines that the guide is over, and the procedure of FIG. 23 ends.

On the other hand, if not coincident, the CPU 11 receives the detection signal $S_2$ from the detector 19 and, based thereon, determines whether the main device has been removed from the holder 2 or not (step S237). If not removed, the CPU 11 regards that the operation has to be continued in "on-vehicle mode". Therefore, the procedure returns to step S234 for further vehicle guidance. If removed, on the other hand, the CPU 11 prepares for mode transition (step S238), in a similar manner to that in step S107.

The CPU 11 then carries out a route search in "off-vehicle mode" (step S239), in a similar manner to that in step S108. The detailed process of step S239 is similar to that shown in FIG. 8, but different in that the road network data $D_{NET}$ read into the internal storage 71 in step S235 is further read into the RAM 13 in step S81. After step S239, the CPU 11 carries out operation similar to those in step,S109 through S1012 (steps S2310 through S2313).

With the above process shown in FIGS. 22 and 23, while operating in "on-vehicle mode", the navigation device $N_6$ reads in advance the cartographic file $F_{CART}$ and road network data $D_{NET}$ to be used in "off-vehicle mode" from the external storage 81 on the holder 2 side into the internal storage 71 on the main device 1 side. Thus, even though the external storage 81 is incorporated in the holder 2 side, the main device 1 can guide the pedestrian in "off-vehicle mode" without any problem. Also, the main device 1 can be reduced in size and weight.

In the above sixth embodiment, what is used for navigation in "off-vehicle mode" is the data read from the external storage 81 into the internal storage 71. Alternatively, if the navigation device $N_6$ can access to the Internet and a Web server that provides the cartographic file $F_{CART}$ and the road network data $D_{NET}$ exists on the Internet, for example, the navigation device $N_6$ may carry out navigation by obtaining these file and data from the Web server. Note that this alternative can be applied to the other embodiments. In other words, the main device 1 according to the first to fifth embodiments may carry out navigation by obtaining these file and data over the Internet. Therefore, the storage 14 according to the first to fifth embodiments does not have to be incorporated in the main device 1.

As described above, the navigation device $N_6$ according to the sixth embodiment can achieve reduction in size and weight of the main device 1 of the navigation device $N_2$. The point in the sixth embodiment can be also applied to the navigation devices $N_3$ to $N_5$. That is, in these navigation devices $N_3$ to $N_5$, the cartographic file $F_{CART}$ and the road network data $D_{NET}$ to be used in "off-vehicle mode" may be read in advance during "on-vehicle mode".

In the first to sixth embodiments, the route search in "on-vehicle mode" is carried out with the procedure shown in FIG. 7, for the sake of simplifying description. Alternatively, if a VICS (Vehicle Information and Communications System) receiver is provided in the navigation devices $N_1$ to $N_6$ for receiving traffic information, the route search may be carried out by using the received traffic information. Such VICS receiver is often used in "on-vehicle mode", and therefore preferable implemented outside the main device 1.

In the first to sixth embodiments, for the sake of simplifying description, a search is made in "on-vehicle mode" (refer to FIG. 7) for a route abiding by the traffic regulations for vehicles, while a search is made in "off-vehicle mode" (refer to FIG. 8) without referring to such regulations. Alternatively, in "on-vehicle mode", a route search may be made by referring to a predetermined speed based on the road width and/or road type of a road, that is, a speed at which the vehicle travels the road. Also, in "off-vehicle mode", a route search may be made by referring to a walking speed at which the pedestrian travels the road.

Furthermore, first road network data dedicated to route search for vehicles and second road network data dedicated to route search for pedestrians may be provided. Here, assume that the first road network data is generated based on roads that can be traveled by vehicles or sea roads that can be traveled by vehicles on ships. Also assume that he second road network data is generated based on roads as well as skywalks, underground passageways, bus networks, railroad networks, air routes, sea routes, passageways in buildings and others that can be passed by pedestrians. Each of the navigation devices $N_1$ to $N_6$ is so structured as to use the first road network data for route search in "on-vehicle mode", and the second road network data for route search in "off-vehicle mode".

In the first to sixth navigation devices $N_1$ to $N_6$, for the sake of simplifying the description, an antenna for receiving radio waves from artificial satellites through the air has not been mentioned. At least one such antenna is provided for the main device 1. Alternatively, two such antennas may be provided for each of the navigation devices $N_1$ to $N_6$. In this case, one antenna is incorporated in the main device 1, functioning when the main device 1 operates in "off-vehicle mode". The other is mounted on the vehicle and connected to the main device 1 via a cable. The other antenna functions when the main device 1 operates in "on-vehicle mode".

Furthermore, in the above first and second embodiments, the main device 1 operates in on-vehicle mode while mounted on the holder 2 and in off-vehicle mode while removed therefrom. However, the navigation devices $N_1$ and $N_2$ may be used inside the vehicle without being mounted on the holder 2. For example, the main device 1 may be used by a person in a passenger seat or rear seat. In this case, an auxiliary technique is incorporated into the navigation devices $N_1$ and $N_2$ for determining the operation mode based on the detection signal $S_4$ (refer to the third embodiment), the operation signal $S_5$ (refer to the fourth embodiment), and the notification signal $S_6$ all together. Thus, the main device 1 can operate in on-vehicle mode even though it is used inside the vehicle without being mounted on the holder 2.

Still further, in the third to fifth embodiments, the navigation devices $N_3$ to $N_5$ each include the holder 2 for holding the main device 1, enabling the user to easily view the map and route from a driver's seat. However, the user may sit in a passenger seat and operate the main device 1 without mounting it on the holder 2. Therefore, the holder 2 is not necessarily required in the navigation devices $N_3$ to $N_5$.

While the invention has been described in detail, the foregoing description is in all aspects illustrative and not restrictive. It is understood that numerous other modifications and variations can be devised without departing from the scope of the invention.

What is claimed is:

1. A navigation device usable inside and outside a vehicle, comprising:
    a determination part for determining whether said navigation device is used inside or outside the vehicle; and
    a navigation processing part, wherein:
        if said determination part determines that said navigation device is used inside the vehicle, said navigation processing part carries out first navigation suitable for use inside of the vehicle; and
        if said determination part determines that said navigation device is used outside the vehicle, said navigation processing part carries out second navigation suitable for use outside of the vehicle.

2. The navigation device according to claim 1, wherein:
    said navigation processing part uses a first cartographic file representing a relatively large area in the first navigation, and uses a second cartographic file representing a relatively small area in the second navigation.

3. The navigation device according to claim 1, further comprising:
    a memory for storing road network data indicating a connecting relation among roads, wherein:
        if said determination part determines that said navigation device is used inside the vehicle, said navigation processing part searches for a first route for guiding the vehicle from a starting point to a destination point based on the road network data stored in said memory; and
        if said determination part determines that said navigation device is used outside the vehicle, said navigation processing part searches for a second route for guiding a pedestrian from the starting point to the destination point based on the road network data stored in said memory.

4. The navigation device according to claim 3, wherein:
    the road network data includes a record indicating a traffic regulation provided for each of the roads; and
    said navigation processing part searches for the first route abiding by the traffic regulation for the vehicle by referring to the record.

5. The navigation device according to claim 1, further comprising:
    a main device accommodating said determination part and said navigation processing part; and
    a holder mounted on the vehicle and removably holding said main device, wherein:
        said main device further comprises a detector for detecting whether said holder holds said main device or not; and
        said determination part determines whether said navigation device is used inside or outside the vehicle based on a detection result by said detector.

6. The navigation device according to claim 4, wherein:
    said navigation processing part starts the second navigation while carrying out the first navigation if said determination part determines that said navigation device is used outside the vehicle; and
    said navigation processing part starts the first navigation while carrying out the second navigation if said determination part determines that said navigation device is used inside the vehicle.

7. The navigation device according to claim 5, further comprising:
    an external storage unit provided outside said main device for storing data required for the first navigation and the second navigation.

8. The navigation device according to claim 7, wherein:
said main device further includes an internal storage unit which is smaller and lighter than said external storage unit; and
said navigation processing part reads, while carrying out the first navigation, data required for the second navigation from said external storage unit to said internal storage unit.

9. The navigation device according to claim 1, further comprising:
a terminal for connecting to a device which is fixed to the vehicle and is capable of specifying whether the vehicle is driven or parked; and
a detector for detecting whether the vehicle is driven or parked by monitoring a state of said terminal, wherein:
said determination part determines whether said navigation device is used inside or outside the vehicle based on a detection result by said detector.

10. The navigation device according to claim 9, wherein:
said navigation processing part starts the second navigation while carrying out the first navigation if said determination part determines that said navigation device is used outside the vehicle; and
said navigation processing part starts the first navigation while carrying out the second navigation if said determination part determines that said navigation device is used inside the vehicle.

11. The navigation device according to claim 9, farther comprising:
a main device accommodating said determination part and said navigation processing part; and
an external storage unit provided outside said main device for storing data required for the first navigation and the second navigation.

12. The navigation device according to claim 11, wherein:
said main device further includes an internal storage unit which is smaller and lighter than said external storage unit; and
said navigation processing part reads, while carrying out the first navigation, data required for the second navigation from said external storage unit to said internal storage unit.

13. The navigation device according to claim 1, further comprising:
an input part for at least generating, in response to an operation by a user, an operation signal indicating a point where a user gets on or off the vehicle, wherein:
said determination part determines whether said navigation device is used inside or outside the vehicle based on the operation signal from said input part.

14. The navigation device according to claim 13, further comprising:
a terminal for connecting to a device which is fixed to the vehicle and is capable of specifying whether the vehicle is driven or parked; and
a detector for detecting whether the vehicle is driven or parked by monitoring a state of said terminal, wherein:
said determination part determines whether said navigation device is used inside or outside the vehicle based on the operation signal from said input part and a detection result by said detector.

15. The navigation device according to claim 13, wherein:
said navigation processing part starts the second navigation while carrying out the first navigation if said determination part determines that said navigation device is used outside the vehicle; and
said navigation processing unit starts the first navigation while carrying out the second navigation if said determination part determines that said navigation device is used inside the vehicle.

16. The navigation device according to claim 13, further comprising:
a main device accommodating said determination part and said navigation processing part; and
an external storage unit provided outside said main device for storing data required for the first navigation and the second navigation.

17. The navigation device according to claim 16, wherein:
said main device further includes an internal storage unit which is smaller and lighter than said external storage unit; and
said navigation processing part reads, while carrying out the first navigation, data required for the second navigation from said external storage unit to said internal storage unit.

18. The navigation device according to claim 13, wherein said input part comprises at least one of a remote controller, a touch sensor, a keyboard, and a mouse.

19. The navigation device according to claim 1, further comprising:
an input part for at least generating, in response to an operation by a user, an operation signal indicating timing where a user gets on or off the vehicle, wherein:
said determination part determines whether said navigation device is used inside or outside the vehicle based on the operation signal from said input part.

20. The navigation device according to claim 19, wherein:
said navigation processing part starts the second navigation while carrying out the first navigation if said determination part determines that said navigation device is used outside the vehicle; and
said navigation processing part starts the first navigation while carrying out the second navigation if said determination part determines that said navigation device is used inside the vehicle.

21. The navigation device according to claim 19, further comprising:
a main device accommodating said determination part and said navigation processing part; and
an external storage unit provided outside said main device for storing data required for the first navigation and the second navigation.

22. The navigation device according to claim 21, wherein:
said main device further includes an internal storage unit which is smaller and lighter than said external storage unit; and
said navigation processing part reads, while carrying out the first navigation, data required for the second navigation from said external storage unit to said internal storage unit.

23. The navigation device according to claim 19, wherein said input part comprises at least one of a remote controller, a touch sensor, a keyboard, and a mouse.

24. The navigation device according to claim 1, further comprising:
a main device accommodating said determination part and said navigation processing part; and
an external communications controller provided outside said main device and fixed to the vehicle for communicating with said main device, wherein:

said main device further comprises an internal communications controller for generating a notification signal indicating whether communications are possible with said external communications controller; and said determination part determines said navigation device is used inside or outside the vehicle based on the notification signal from said internal communications controller.

25. The navigation device according to claim 24, wherein:

said navigation processing unit starts the second navigation while carrying out the first navigation if said determination part determines that said navigation device is used outside the vehicle; and said navigation processing part starts the first navigation while carrying out the second navigation if said determination part determines that said navigation device is used inside the vehicle.

26. The navigation device according to claim 24, further comprising:

an external storage provided outside said main device for storing data required for the first navigation and the second navigation.

27. The navigation device according to claim 26, wherein:

said main device further includes an internal storage unit which is smaller and lighter than said external storage unit; and said navigation processing part reads, while carrying out the first navigation, data required for the second navigation from said external storage unit to said internal storage unit.

28. The navigation device according to claim 24, wherein:

said external communication controller transmits a radio wave with electric power substantially covering the inside of the vehicle to communicate with said internal communications controller.

29. The navigation device according to claim 1, further comprising an output device for displaying a map.

30. The navigation device according to claim 29, wherein said output device comprises a liquid crystal display device and a loudspeaker.

31. A method for navigation using a computer device usable inside and outside a vehicle, said method comprising:

determining, using the computer device, whether the computer device is used inside or outside the vehicle;

carrying out first navigation suitable for use in the vehicle if it is determined in said determining that the computer device is used inside the vehicle; and carrying out second navigation suitable for use outside the vehicle if it is determined in said determining that the computer device is used outside the vehicle.

32. A computer-readable recording medium containing a program for use with a computer device usable inside and outside a vehicle, said program operable to:

determine, using the computer device, whether the computer device is used inside or outside the vehicle;

carry out first navigation suitable for use in the vehicle if it is determined in said determine that the computer device is used inside the vehicle; and carrying out second navigation suitable for use outside of the vehicle if it is determined in said determine that the computer device is used outside the vehicle.

33. A computer-readable program for use with a computer device usable inside and outside a vehicle, said program operable to:

determine, using the computer device, whether the computer device is used inside or outside the vehicle;

carry out first navigation suitable for use in the vehicle if it is determined in said determine that the computer device is used inside the vehicle; and carrying out second navigation suitable for use outside of the vehicle if it is determined in said determine that the computer device is used outside the vehicle.

* * * * *